(12) United States Patent
Wesemann et al.

(10) Patent No.: US 8,266,677 B2
(45) Date of Patent: Sep. 11, 2012

(54) UDP COMMUNICATION WITH A PROGRAMMER INTERFACE OVER WIRELESS NETWORKS

(75) Inventors: Darren L. Wesemann, North Salt Lake, UT (US); Joel E. Hull, Bountiful, UT (US); Olaf D Jensen, West Valley City, UT (US)

(73) Assignee: Intellisync Corporation, San Jose, CA (US)

( * ) Notice: Subject to any disclaimer, the term of this patent is extended or adjusted under 35 U.S.C. 154(b) by 2353 days.

(21) Appl. No.: 10/884,412

(22) Filed: Jul. 2, 2004

(65) Prior Publication Data

US 2005/0055577 A1   Mar. 10, 2005

Related U.S. Application Data

(63) Continuation-in-part of application No. 10/794,243, filed on Mar. 5, 2004, now Pat. No. 7,673,133, which is a continuation-in-part of application No. 09/767,465, filed on Jan. 22, 2001, now Pat. No. 7,124,189.

(60) Provisional application No. 60/452,248, filed on Mar. 5, 2003, provisional application No. 60/257,481, filed on Dec. 20, 2000.

(51) Int. Cl.
*H04L 29/06* (2006.01)
(52) U.S. Cl. ......... 726/4; 726/1; 726/2; 726/13; 726/14; 726/27; 709/227; 709/229; 709/231; 709/230; 709/225; 713/150; 713/151; 713/160
(58) Field of Classification Search ................... None
See application file for complete search history.

(56) References Cited

U.S. PATENT DOCUMENTS

| | | | |
|---|---|---|---|
| 5,142,622 A | | 8/1992 | Owens |
| 5,594,869 A | | 1/1997 | Hawe et al. |
| 5,946,467 A | * | 8/1999 | Pathakis et al. ............... 709/236 |
| 6,032,227 A | | 2/2000 | Shaheen et al. |
| 6,061,796 A | | 5/2000 | Chen et al. |
| 6,076,114 A | * | 6/2000 | Wesley ......................... 709/235 |
| 6,081,900 A | | 6/2000 | Subramaniam et al. |
| 6,092,113 A | | 7/2000 | Maeshima et al. |

(Continued)

OTHER PUBLICATIONS

Okada et al., "Achieving High Scalability in VPN-Exchange, a Method of Constructing Star-type End-to-end VPN", Research Report, Feb. 15, 2002, NTT Information Sharing Platform Laboratories, pp. 115-120, vol. 2002, No. 12, Information Processing Society of Japan.

(Continued)

*Primary Examiner* — Syed A. Zia
(74) *Attorney, Agent, or Firm* — Alston & Bird LLP

(57) ABSTRACT

Systems and methods provide for secure communications between local and remote devices or networks in virtual private networks. Data can be communicated between the local and remote devices using the User Datagram Protocol (UDP) to reduce network overhead for the data communications. The UDP-based data communications are made secure and reliable by various techniques, for example: confirming that a packet sent by a source component is received by the receiving component, and guaranteeing packet sequencing by buffering packets as they are received and only delivering them to the target in the original sequence that they were sent from the source. Because TCP based communications are common, a TCP-style API can be used to enable programmers to more easily implement the UDP-based communications. Other embodiments of the invention relate to transport protocol enhancements for use within virtual private networks, including protocol mapping, protocol buffering, and protocol filtering.

19 Claims, 8 Drawing Sheets

U.S. PATENT DOCUMENTS

| | | | |
|---|---|---|---|
| 6,092,200 | A | 7/2000 | Muniyappa et al. |
| 6,101,545 | A * | 8/2000 | Balcerowski et al. ........ 709/230 |
| 6,104,716 | A | 8/2000 | Crichton et al. |
| 6,138,049 | A | 10/2000 | McLaughlin |
| 6,161,123 | A * | 12/2000 | Renouard et al. ............ 709/203 |
| 6,173,399 | B1 | 1/2001 | Gilbrech |
| 6,178,505 | B1 | 1/2001 | Schneider et al. |
| 6,226,748 | B1 | 5/2001 | Bots et al. |
| 6,229,809 | B1 * | 5/2001 | Murphy et al. .............. 370/401 |
| 6,233,608 | B1 | 5/2001 | Laursen et al. |
| 6,292,839 | B1 * | 9/2001 | Naudus et al. ................ 709/238 |
| 6,292,905 | B1 | 9/2001 | Wallach et al. |
| 6,295,551 | B1 | 9/2001 | Roberts et al. |
| 6,332,195 | B1 | 12/2001 | Green et al. |
| 6,411,986 | B1 | 6/2002 | Susai et al. |
| 6,430,604 | B1 | 8/2002 | Ogle et al. |
| 6,473,411 | B1 | 10/2002 | Kumaki et al. |
| 6,529,500 | B1 | 3/2003 | Pandharipande |
| 6,546,425 | B1 | 4/2003 | Hanson et al. |
| 6,563,800 | B1 | 5/2003 | Salo et al. |
| 6,594,246 | B1 * | 7/2003 | Jorgensen .................... 370/338 |
| 6,609,148 | B1 | 8/2003 | Salo et al. |
| 6,631,416 | B2 * | 10/2003 | Bendinelli et al. ............ 709/227 |
| 6,674,713 | B1 * | 1/2004 | Berg et al. .................... 370/217 |
| 6,704,768 | B1 | 3/2004 | Zombek et al. |
| 6,748,559 | B1 * | 6/2004 | Pfister et al. .................... 714/56 |
| 6,765,881 | B1 | 7/2004 | Rajakarunanayake |
| 6,801,509 | B1 | 10/2004 | Chuah et al. |
| 6,874,030 | B1 | 3/2005 | Sheth et al. |
| 6,922,557 | B2 * | 7/2005 | Fantaske ...................... 455/403 |
| 7,116,662 | B2 * | 10/2006 | Joung ........................... 370/392 |
| 7,313,822 | B2 | 12/2007 | Ben-Itzhak |
| 7,315,897 | B1 * | 1/2008 | Hardee et al. ................. 709/229 |
| 7,426,636 | B1 * | 9/2008 | McGrew et al. .............. 713/160 |
| 7,428,595 | B2 * | 9/2008 | Deshpande .................... 709/235 |
| 7,953,838 | B1 * | 5/2011 | Mukerji ......................... 709/223 |
| 8,117,340 | B2 * | 2/2012 | Williams et al. .............. 709/245 |
| 2001/0039587 | A1 | 11/2001 | Uhler et al. |
| 2002/0010866 | A1 * | 1/2002 | McCullough et al. ........ 713/201 |
| 2002/0023210 | A1 | 2/2002 | Tuomenoksa et al. |
| 2002/0026474 | A1 * | 2/2002 | Wang et al. ................... 709/203 |
| 2002/0099826 | A1 | 7/2002 | Summers et al. |
| 2002/0161904 | A1 | 10/2002 | Tredoux et al. |
| 2003/0018793 | A1 * | 1/2003 | Mora ............................ 709/230 |
| 2004/0148425 | A1 * | 7/2004 | Haumont et al. ............. 709/236 |
| 2004/0255164 | A1 | 12/2004 | Wesemann |
| 2005/0005014 | A1 * | 1/2005 | Holmes et al. ................ 709/227 |
| 2008/0037537 | A1 * | 2/2008 | Yao et al. ...................... 370/389 |
| 2008/0140847 | A1 * | 6/2008 | Almog .......................... 709/228 |
| 2009/0133105 | A1 * | 5/2009 | Larsen ............................... 726/5 |

OTHER PUBLICATIONS

Japanese Office Action, corresponding to Japanese Patent Application No. 2006/501219; pp. 1-5.

Aqun et al. *"Research on Tunneling Techniques in Virtual Private Networks"*, IEEE, Aug. 2000, pp. 691-697, especially pp. 692-696.

Cobb, S., *"Security Issues in Internet Commerce"*, IEEE, Jul. 1996, pp. 186-191.

* cited by examiner

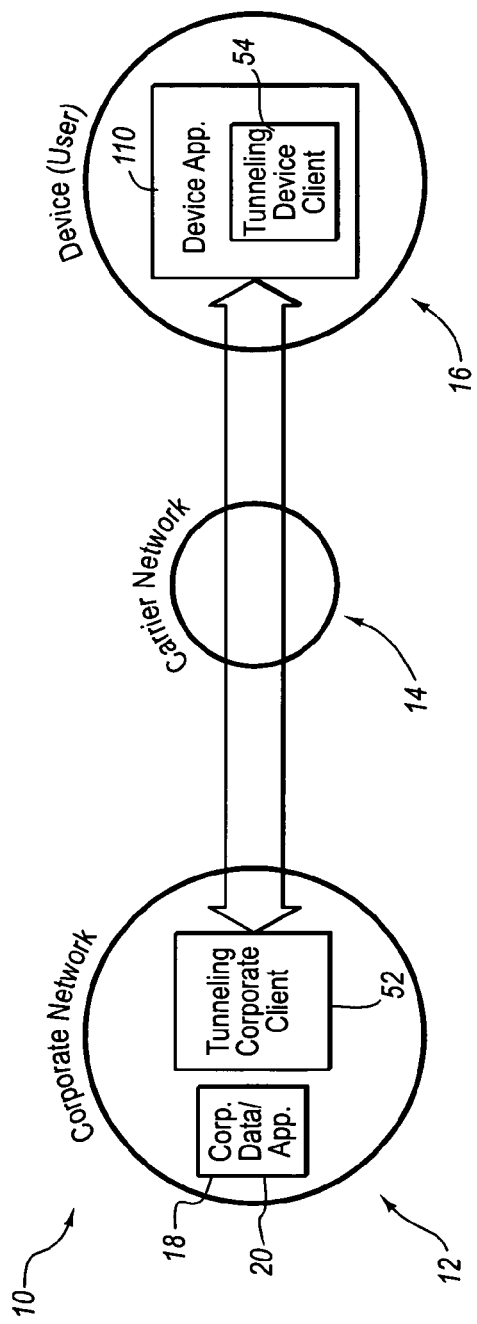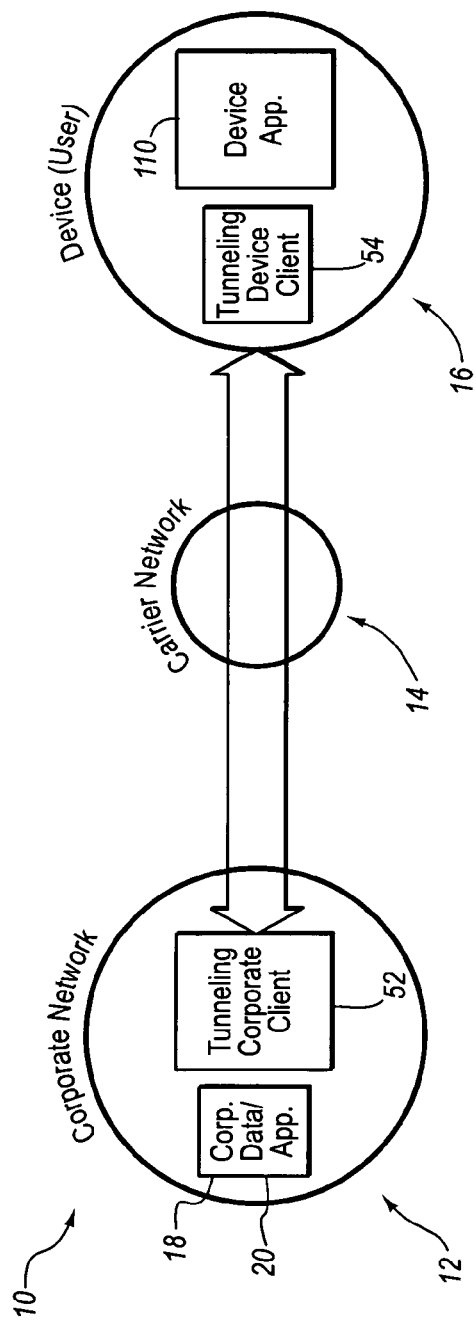

UDP COMMUNICATION WITH A PROGRAMMER INTERFACE OVER WIRELESS NETWORKS

CROSS-REFERENCE TO RELATED APPLICATIONS

This application is a continuation-in-part of U.S. patent application Ser. No. 10/794,243, filed Mar. 5, 2004, now U.S. Pat. No. 7,673,133 which claims the benefit of U.S. Provisional Patent Application Ser. No. 60/452,248, filed Mar. 5, 2003. Said U.S. patent application Ser. No. 10/794,243 is also a continuation-in-part of U.S. patent application Ser. No. 09/767,465, filed Jan. 22, 2001, now U.S. Pat. No. 7,124,189 which claims the benefit of U.S. Provisional Patent Application Ser. No. 60/257,481, filed Dec. 20, 2000. The foregoing patent applications are incorporated herein by reference.

BACKGROUND OF THE INVENTION

1. The Field of the Invention

The present invention generally relates to virtual private networks. In particular, the present invention relates to systems and methods for enabling both the exchange of data and the execution of software applications remotely via a virtual private network. More particularly, one aspect of the present invention relates to various communication features, including protocol features, that enable and enhance the use of the User Datagram Protocol (UDP) in facilitating the communications.

2. The Related Technology

In today's business world, many businesses protect their data from unauthorized access by installing firewalls into their network infrastructure. Typically, a firewall prevents unidentified users from accessing network data from a remote location. Although firewalls are generally very beneficial for enabling a business to have more control over who accesses its network data, they also have the undesirable consequence of disconnecting mobile professionals from critical and urgent business information when they are away from the office or otherwise unable to gain local access to the network data.

To enable a mobile professional to access business information from a remote location, some businesses have installed virtual private networks (VPNs) between the business and designated remote locations, such as from a professional's home or satellite office. The function of a VPN is to open a secure connection between the business network and a designated remote location through the business firewall. Although beneficial for providing remote access to network data, a VPN often requires the installation of expensive hardware and/or software at the business network and sometimes at the remote location.

In typical VPN arrangements, a user communicates with a business network from a remote location through a VPN tunnel. At each end of the VPN tunnel is a VPN node. At the business network, one of the VPN nodes straddles the business network's firewall. Network data is transmitted through the firewall at the VPN node and through the VPN tunnel to the user. It may also be possible for a remote business to communicate with the business network through a second VPN tunnel between the two VPN nodes.

VPN hardware and software employ encryption technology and other security features at the VPN nodes to ensure that data transmitted through a VPN tunnel is not intercepted and that the user or remote business is authorized to access the business network data. The benefits of a VPN, however, are limited to discrete, remote locations where the appropriate VPN software and/or hardware is installed. Accordingly, VPNs do not currently provide users with mobile remote access to network data stored behind business firewalls. In particular, conventional VPN does not readily enable a user to access network data from a telephone while commuting in a moving vehicle, or from various other mobile devices, including pagers, personal digital assistants ("PDAs"), and laptop computers.

With regard to the aforesaid mobile devices, it is highly desirable in today's mobile society to provide enhanced connectivity between such devices and a remote location, such as a business network at the user's place of employment. The ability for such mobile devices to remotely and securely exchange both data and applications with the business network greatly enhances both their utility and value, particularly for mobile professionals and others who spend a significant amount of time away from the office. As already described, typical VPN configurations do not readily enable such mobile remote connectivity.

In addition, there is a need to maintain the bandwidth usage for data transmission to remote wireless devices to a minimum. The data transport mechanisms associated with the conventional TCP/IP systems currently use greater bandwidth than is desirable. Systems and methods that reduce the bandwidth usage would therefore represent a significant advance in the field.

Further complicating the secure transfer of data between a remote device and the business network is the fact that the remote device and business network may employ respectively differing communication protocols for transmitting data. For example, an e-mail application locally based in a business network may employ the Messaging Application Programming Interface ("MAPI") protocol for exchanging e-mail messages to network users. A remote device, such as a PDA, however, may use the differing Post Office Protocol ("POP") for retrieving, sending, and reading e-mail. Without resolution, the incongruity of the two protocols renders communication between the remote and local devices impossible.

In view of the foregoing, a need currently exists for providing a means by which secure communication can be transacted between a local host device and a remote device without the attendant problems discussed above. In addition, such a means should provide for the ability to exchange data and/or share applications between the host and remote device even in cases where differing protocols are respectively employed.

BRIEF SUMMARY OF THE INVENTION

The present invention relates to systems and methods for establishing secure communications between a local device or network and a remote device or network. The secure communications are enabled via a virtual private network, or tunnel, established between the devices or networks. More particularly, one aspect of the present invention relates to various communication features that enable and enhance the use of the User Datagram Protocol (UDP) in facilitating the communications. In addition, transport protocol enhancements as further described below are also provided for use within the virtual private networks.

More specifically, aspects of the present invention relate to methods and systems wherein each of a computing network and a remote device, and optionally an intermediate carrier network, each include a tunneling client. The tunneling clients enable the establishment of data tunnel legs between the computing network and the carrier network and/or between the carrier network and the remote device.

UDP is a connectionless protocol that, like TCP, runs on top of IP networks. Because UDP lacks many reliability-related features of TCP, UDP is used typically for broadcasting messages over a network. According to one embodiment of the invention, a programmer is provided with a TCP style programmer interface for programming software modules that use UDP over wireless networks. This is provided, in part, because TCP is the protocol that programmers are most familiar with. In addition, in order to use UDP in wireless networks, other embodiments of the invention provide guaranteed packet delivery by one or more of various techniques. These techniques can include, among other things: confirming that a packet sent by a source component is received by the receiving component; guaranteeing packet sequencing by buffering packets as they are received and only delivering them to the target end of the tunnel in the original sequence that they were sent from the source end of the tunnel; separating data into optimally sized packets at the source end of the tunnel and then reassembling the packets at the target end of the tunnel; combining small data packets into larger packets that are more optimally sized for transmission; as well as the use of checksums, compression, and encryption.

The transport protocol enhancements include protocol mapping, protocol buffering, and protocol filtering for use in virtual private networks. Protocol mapping allows for data transfer between the corporate network and the remote device over different protocols. This is achieved as templates are assigned to protocols and inflection points on different templates are mapped to each other. By way of example, protocol mapping allows e-mail sent from a remote device in the POP protocol to be mapped to an e-mail server in the corporate network in the MAPI protocol.

Protocol buffering can be implemented with the protocol mapping feature to accommodate mapping between protocols when certain complicating circumstances arise. In one circumstance, transient conditions occurring along the communication route can temporarily interrupt the stream of data transmitted between the corporate network and the remote device. If this occurs, a specified template can temporarily suspend the transmission of the data and instead store the data within the template itself until the transient conditions along the communication route are resolved and the data tunnel is reestablished.

Protocol filtering matches incoming data packets against protocol templates. If the data packets match a particular protocol template, they are input into that template and processed. If no matching template is found for a particular data packet, the system can reject the data packet and delete it from the system. Protocol filtering enables the system to act in an auxiliary firewall capacity by rejecting those data packets, such as hacker-related and malicious packets, that do not fit within pre-configured data templates, thereby enhancing security within the system.

Accordingly, a first example embodiment of the invention is a method for transmitting data in a secure manner between a computing network and a remote device. Each of the computing network and the remote device include a tunneling client. This method generally includes: establishing a data tunnel leg between a tunneling switch of a carrier network and a tunneling client of a computing network; at the tunneling switch of the carrier network, receiving a first packet from a tunneling client of a remote device in a UDP protocol, the first packet comprising a request for access to network data stored on the computing network; transmitting a packet acknowledgement signal from the tunneling switch to the remote device, wherein the tunneling client of the remote device can use the packet acknowledgement signal to confirm that the first packet was accurately transmitted; and transmitting, via the data tunnel leg, the first packet from the tunneling switch to the computing network.

Another example embodiment of the invention is a method performed in a device having a tunneling client. This method enables a user operating a device to access network data of a remote computing network. The method generally includes: transmitting a UDP-formatted packet to a tunneling switch on a carrier network, the packet comprising a request to access network data stored on a remote computing network, wherein a data tunnel leg has previously been established between the tunneling switch and the remote computing network; receiving a packet acknowledgement signal from the tunneling switch, whereby the device can use the packet acknowledgement signal to confirm that the packet was accurately received by the tunneling switch; receiving the requested data from the remote computing network via the tunneling switch in the form of one or more UDP-formatted packets; and transmitting a second packet acknowledgement signal to the tunneling switch, whereby the tunneling switch can use the second packet acknowledgement signal to confirm that one of the one or more UDP-formatted requested data packets were accurately transmitted.

Yet another example embodiment of the invention is a method for transmitting data in a secure manner between a device and remote computing network via a carrier network. Each of the computing network and the device, and optionally the carrier network, include a tunneling client. The method generally includes: establishing a first data tunnel leg between a tunneling client of a remote computing network and a carrier network, the carrier network including a tunneling server; establishing a second data tunnel leg between the carrier network and a device; at a tunneling client of the device, fitting data in a first protocol format to a first template, the first template located in a tunneling client of the remote device and comprising one or more inflection points that correspond to commands or other data aspects of the first protocol; transmitting the templated data to the computing network via the first data tunnel leg; and at the tunneling client of the computing network, if the first template matches a second template, the second template comprising one or more inflection points that correspond to commands or other data aspects of a second protocol, matching the inflection points of the first template to the inflection points of the second template, whereby data of the first protocol format is switched to represent the data in the second protocol format.

Another example embodiment of the invention is a system for enabling a user of a remote device to access network data and software applications stored on a computing network. The system generally includes: a first tunneling client on a remote device; a second tunneling client on a computing network; and a tunneling server on a carrier network. The second tunneling client and the tunneling server are configured to communicate with each other and maintain a first data tunnel leg therebetween. The first tunneling client, the second tunneling client, and the tunneling server are also each configured to transmit and receive data packets that are transmitted in a UDP protocol, wherein each of the first tunneling client, the second tunneling client, and the tunneling server are further configured to send confirmation signals upon receipt of UDP-formatted data packets that enable the sending application to verify that the UDP-formatted data packets were accurately transmitted.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4A is a block diagram depicting the operational relationship between local and remotes devices according to one embodiment;

FIG. 4B is a block diagram depicting the operational relationship between local and remotes devices according to another embodiment;

DETAILED DESCRIPTION OF THE PREFERRED EMBODIMENTS

Figure 1:
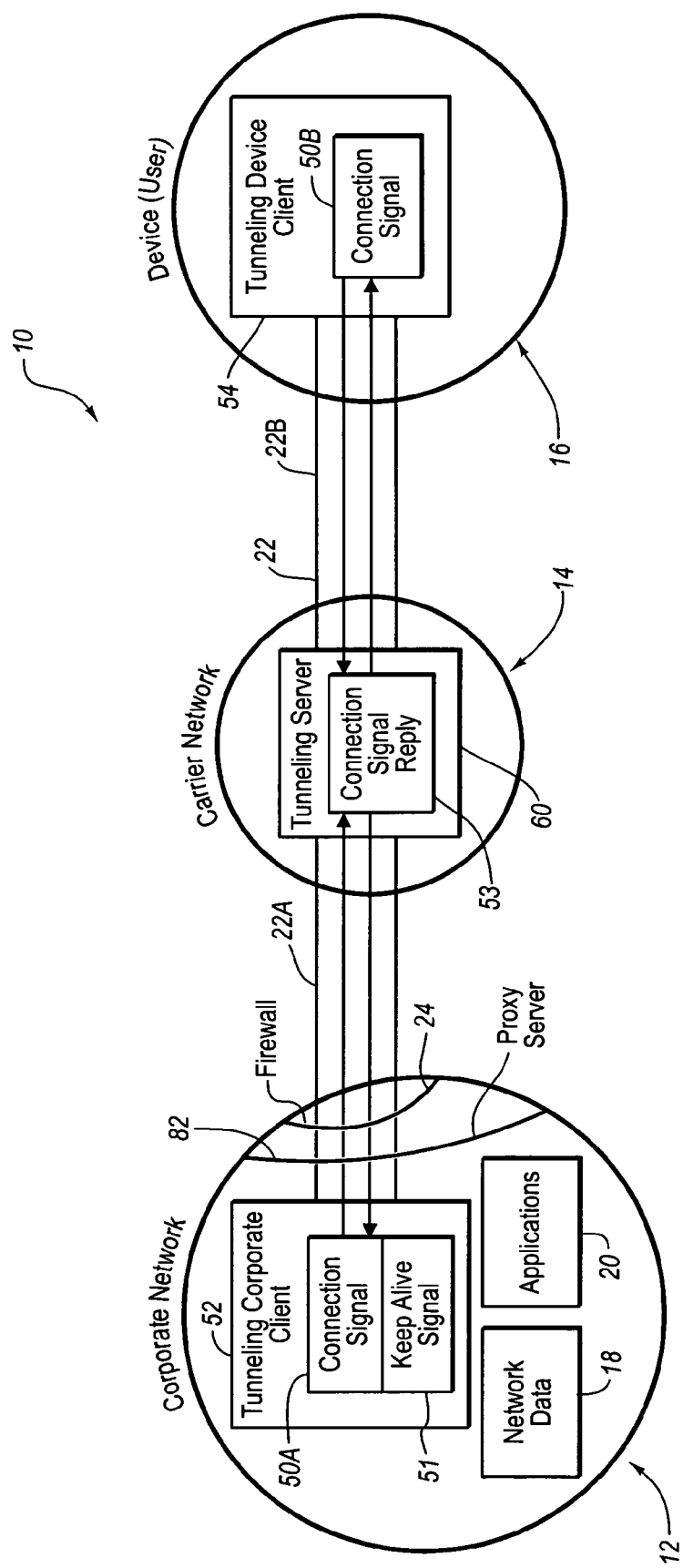
FIG. 1 is a block diagram illustrating various components employed in a system for enabling secure communication between a local host device or network and a remote device, the system being shown in a first state.

The present invention relates to systems and methods for establishing secure communications between a local device or network and a remote device or network. The secure communications are enabled via a virtual private network established between the devices or networks. The methods and systems provide each of a computing network and a remote device, and optionally an intermediate carrier network, with a tunneling client. The tunneling clients enable the establishment of data tunnel legs between the computing network and the carrier network and/or between the carrier network and the remote device.

More particularly, one aspect of the present invention relates to various communication features that enable and enhance the use of the User Datagram Protocol (UDP) in facilitating the communications. As used herein, the term "packet" includes within its scope "datagram." A datagram is a piece of a message transmitted over an IP network. One of the features of a datagram is that it contains the destination address in a header in addition to the data. More generally, however, datagrams are a type of packets. According to the invention, packets, preferably UDP-formatted as disclosed herein, are communicated back and forth to enable the remote device to access data and/or applications stored on the computing network.

UDP is a connectionless protocol that, like TCP, runs on top of IP networks. Because UDP lacks many reliability-related features of TCP, UDP is used primarily for broadcasting messages over a network. According to one embodiment of the invention, a programmer is provided with a TCP style programmer interface for programming software modules that use UDP over wireless networks. This is provided, in part, because TCP is the protocol that programmers are most familiar with. In addition, in order to use UDP in wireless networks, another embodiment of the invention provides guaranteed packet delivery by one or more of various techniques. These techniques can include, among other things: confirming that a packet sent by a source component is confirmed by the receiving component; and guaranteeing packet sequencing by buffering packets as they are received and only delivering them to the target end of the pipe in the original sequence that they were sent from the source end of the pipe.

In addition, transport protocol enhancements are also provided for use within the virtual private networks. These transport protocol enhancements include, for example, protocol mapping, protocol buffering, and protocol filtering for use in virtual private networks. Protocol mapping allows for data transfer between the corporate network and the remote device over different protocols. This is achieved as templates are assigned to protocols and inflection points on different templates are mapped to each other. By way of example, protocol mapping allows e-mail sent from a remote device in the POP protocol to be mapped to an e-mail server in the corporate network in the MAPI protocol. Protocol buffering allows a packet template to temporarily suspend the transmission of the data within a data tunnel when transient conditions along the communication route interrupt the communications. Finally, protocol filtering matches incoming data packets against protocol templates. If the data packets match a particular protocol template, they are input into that template and processed. If no matching template is found for a particular data packet, the system can reject the data packet and delete it from the system.

Reference will now be made to the figures wherein like structures will be provided with like reference designations. It is understood that the drawings are diagrammatic and schematic representations of presently preferred embodiments of the invention, and are not limiting of the present invention nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of computing and communications systems have not been described in particular detail in order to avoid unnecessarily obscuring the present invention.

Embodiments of the present invention include or are incorporated in computer-readable media having computer-executable instructions or data structures stored thereon. Examples of computer-readable media include RAM, ROM, EEPROM, CD-ROM or other optical disk storage, magnetic disk storage or other magnetic storage devices, or any other medium that can be used to carry or store desired program code means in the form of computer-executable instructions or data structures and which can be accessed by a general purpose or special purpose computer. When information is transferred or provided over a network, tunnel, channel or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data that cause a general purpose computer, special purpose computer, or special purpose processing device to perform a certain function or group of functions. The computer-executable instructions and associated data structures or modules represent an example of program code means for executing the steps of the invention disclosed herein.

As previously noted, the invention further extends to computer systems for enabling a remote user access to network data of a corporate network that is stored behind corporate network firewalls. This includes, but is not limited to, opening data tunnels that operate as virtual private networks between the corporate network and a data center, and transmitting network data through the data tunnels. Those skilled in the art will understand that the invention may therefore be practiced in many environments with many types of computer and telephone systems, including portable computers, telephones, wireless telephones, PDA's, personal computers, multi-processor systems, network PCs, minicomputers, mainframe computers, and the like.

1. System Environment

Reference is first made to FIG. 1, which shows one embodiment of a system for enabling secure communication between a local network and a remote device, the system being generally designated at 10. As described, the system 10 generally comprises several components, including a corporate network 12, a carrier network 14, and a remote device 16. In particular, FIG. 1 illustrates systems and methods of the present invention for enabling a user of the remote device 16 to access network data 18 and/or one or more software applications 20 of the corporate network 12 through a data tunnel 22 initially established between the corporate network 12 and carrier network 14, and between the carrier network 14 and the device 16, respectively. In one embodiment, the corporate network 12 is a business computer network containing network data 18 and applications 20 that are protected behind a firewall 24 to prevent unauthorized access.

As used herein, the term "corporate network" should be broadly construed to include any computing environment where tasks are performed by processing devices that are linked together. The corporate network 12 can include, for example, the computing environment or network of any enterprise, business, corporation, individual, or other entity. In the corporate network 12, computer-executable instructions and program modules for performing the features of the invention may be located in local and remote memory storage devices. The term "corporate" used in this context does not require the entity that operates the network to have any business or organizational structure. The term "computing network" includes within its scope "corporate networks."

The term "remote device" is understood to include a variety of electronic devices and apparatus that are remotely disposed with respect to the corporate network. Examples of a remote device include a mobile or cellular phone, PDA, pager, laptop computer, etc. The remote device can be capable of receiving, executing, and transmitting computer-executable instructions.

The terms "network data" and "business network data" should be construed to include any data that is stored in local and remote memory storage devices and is accessible to the corporate network 12. Network data 18 may include for example, email data or web page data. In one embodiment, network data 18 is protected behind a firewall infrastructure that includes the firewall 24. It should be appreciated, however, that network data 18 can include any data that is accessible to the corporate network 12, even if it is not protected behind the firewall infrastructure. Similarly, the term "application" should be broadly construed to include any set of computer executable instructions for performing one or more functions in connection with a computer or other electronic device.

The term "tunnel" should be interpreted to include any channel or other line of communication through which data can be securely transmitted. One skilled in the art will appreciate that there are numerous protocols and methods of encryption and authentication that can be employed to enable secure communication through a tunnel, such that the data transmitted through the tunnel is delivered only to an identified user who is authorized to access said data. It should further be appreciated that the terms "tunnel," "data tunnel," and "channel," are interchangeable as used herein. The tunnel operates as a virtual private network by enabling secure remote access to network data through a business's firewall infrastructure.

In FIG. 1, a data tunnel leg 22A is established between the corporate network 12 and the carrier network 14, and a data tunnel leg 22B is established between the carrier network and the remote device 16. The data tunnel legs 22A and 22B are used to transmit data between the corporate network 12 and the device 16. Specifically, the data tunnel leg 22A in one embodiment is established and maintained as a continuously open data tunnel, or alternatively open when needed for a VPN, between the corporate network 12 and the carrier network 14, through which information can be transmitted from the corporate network 12 for eventual receipt by the remote device 16. The data tunnel leg 22B is also established as a tunnel between the remote device 16 and the carrier network 14 to enable the transfer of information between the remote device and the corporate network 12. The data tunnel leg 22B in one embodiment is only opened as the need for data to be either transmitted from or received by the remote device 16 is present. Thus, in contrast to the data tunnel leg 22A, which is continuously established, the data tunnel leg 22B in one embodiment is intermittently established as the need for communication arises. This arrangement can be preferable in cases where the remote device 16 comprises a battery operated device, such as PDA, where power resources are to be conserved when possible.

In general, to establish the data tunnel leg 22A, the corporate network 12 transmits a connection signal 50A to the carrier network 14. In response, the carrier network 14 establishes the data tunnel leg 22A with the corporate network 12. Similarly, the remote device 16 transmits a connection signal 50B to the carrier network 14, which establishes the data tunnel leg 22B in response. In the illustrated embodiment, the carrier network 14, in establishing the respective data tunnel leg, can send a connection signal reply 53 to the corporate network 12, the remote device 16, or both. It is appreciated, however, that the connection signal reply 53 is not essential in establishing the data tunnel legs 22A or 22B. More details concerning the establishment of the data tunnel legs 22A and 22B are given below.

As used herein, the term "connection signal" should be broadly construed to include data comprising a uniform resource identifier ("URI"), which represents a request for the carrier network to provide access to a web page, hypertext markup language ("HTML") data, extensible markup language ("XML") data, or other data resources. The connection signals 50A and 50B made by the corporate network 12 and the remote device 16, respectively, can be performed independently of each other, or in concert, according to system design. Likewise, the carrier network 14 is preferably configured to respond to each connection signal 50A and 50B independently, though the response to both the corporate network 12 and the remote device 16 by the carrier network can, if desired, be coordinated to occur simultaneously.

In the case of the corporate network 12, the data tunnel leg 22A, once established, is maintained by a keep alive signal 51. In one embodiment, the keep alive signal 51 comprises a small amount of nominal data sent to the corporate network 12 from the carrier network 14 in order to continually maintain the presence of the data tunnel leg 22A. This data is incrementally sent in packets having a size such as 100 bytes. In one embodiment, the keep alive signal 51 can comprise a nominal request for data from the corporate network 12. In response, the corporate network 12 can reply via the data tunnel leg 22A to the carrier network 14 with the requested data, thereby maintaining the tunnel leg 22A open. In a similar manner, the keep alive signal 51 is also sent by the carrier network 14 to the device 16 in order to maintain the presence of the data tunnel leg 22B when that leg is active.

As mentioned above, the data tunnel leg 22A between the corporate network 12 and the carrier network 14 is established repeatedly or on an ongoing basis so that the tunnel leg 22A is continuously available in the event that the remote device 16 attempts to establish the virtual private network connection with corporate network 12 described herein. For instance, the keep alive signal 51 can be sent on a periodic basis with a frequency, such as every 20 seconds, that is high enough to minimize the latency experienced by the remote device 16 when the remote device attempts to establish communication with the virtual private network. The connection signal 50A and the keep alive signal 51 transmitted between the corporate network 12 and the carrier network 14 can be performed automatically and in the background in preparation for the remote device 16 to eventually make the attempt to establish the virtual private network connection. In contrast, the connection signal 50B sent by the remote device 16 to the carrier network 14 is generally performed in response to input from a user of the remote device indicating that the user wishes to establish the virtual private network connection. In the case where multiple corporate networks are included in the present system, the initial connection signal 50B, or data subsequently transmitted over the tunnel leg 22B can identify the target corporate network 12 with which the device is to communicate.

In the case of the corporate network 12, the connection signal 50A, the keep alive signal 51, and the connection signal reply 53 are transmitted through the firewall 24. One skilled in the art will appreciate that the firewall 24 can include hardware, software, or a combination of both. Essentially, a firewall is a security mechanism that prohibits access through designated ports of a network and ensures network data cannot be accessed from an unauthorized user from outside of the firewall. Though only one firewall 24 is shown, multiple firewalls can be employed to afford enhanced data protection, if needed. The connection signal 50A, the keep alive signal 51, and any connection signal reply 53 relating to the corporate network 12 can also pass through one or more proxy servers 82 that are employed in conjunction with the firewall 24 as a security feature.

As shown in FIG. 1, the carrier network 14 receives the connection signals 50A and 50B and transmits keep alive signals 51 using a server. In the present embodiment, a web server, or tunneling server 60, operating as a component of a tunneling network is utilized. Though only one tunneling server 60 is depicted in FIG. 1, it should be appreciated that the carrier network 14 can comprise multiple web and/or tunneling server 60 to enable the carrier network 14 to communicate with multiple corporate networks/remote devices and to maintain multiple data tunnels (not shown). The tunneling server 60 or web servers are examples of "tunneling servers" that operate with tunneling clients as described herein to establish data tunnels between computing networks and remote devices. It should be appreciated that, according to the present invention, multiple data tunnels can be established between a single corporate network or remote device and a single web server, or between a single corporate network or remote device and multiple web servers.

The corporate network 12 and the remote device 16 use a tunneling corporate client 52 and a tunneling device client 54, respectively, to transmit their respective connection signals 50A and 50B to the carrier network 14 and to receive the connection signal reply 53 in response. "Connection signal reply" should be construed to include any data transmitted by the carrier network 14 in response to receiving the connection signal 50A or SOB and which is transmitted in an ongoing manner so as to keep open the tunnel legs 22A and 22B between the carrier network 14 and the corporate network 12, and between the carrier network 14 and the remote device 16, respectively. The tunneling corporate client 52 is an example of a "network client" that operates in the network with which the remote device communicates. Similarly, tunneling corporate client 52 and tunneling device client 54 are examples of "tunneling clients" that reside, respectively, on the network and the remote device and establish data tunnel legs that are connected to form a complete data tunnel as described herein.

As mentioned, data entering or exiting the corporate network 12 must pass through the firewall 24, which acts as a security feature to prevent unauthorized access to the network. In the present invention, penetration of the firewall 24 by the transmission and reception of the connection signals 50A, the keep alive signal 51, and the connection signal reply 53 is accomplished due to the fact that the data are packetized in a TCP/IP or another appropriate format typically associated with web traffic. Thus, transmission of the connection signal 50A, the keep alive signal 51, and the connection signal reply 53 is performed via ports already established through the firewall 24 that are reserved for web traffic, thereby eliminating the need for establishing additional ports through the firewall and simplifying data transmission. Alternatively, the connection signal 50A, the keep alive signal 51, and the connection signal reply 53 can be packetized in a UDP/IP format consistent with the transport of network data according to the invention.

The corporate client 52, the device client 54, and the tunneling server 60 incorporate software for implementing tunneling communication technology, which includes software for initiating or responding to the connection signals 50A and 50B and, as will be described below in further detail, software for transcoding data between protocols, as needed. In turn, this enables the corporate client 52 and the device client 54 to establish the secure data tunnel legs 22A and 22B, respectively, with the tunneling server 60, as referred to earlier. Because a traditional VPN interface between these components is avoided, the challenges corresponding to typical VPN installations are avoided as well. In particular, because the data tunnel legs 22A and 22B are established by sending outgoing connection signals that permit ports to be opened through the firewalls, the virtual private network is established without requiring VPN hardware at the corporate network 12 that is otherwise required in conventional VPN systems. Further details regarding the establishment and use of tunneling connections with components similar to those discussed above can be found in U.S. patent application Ser. No.

09/767,465, entitled "Spontaneous Virtual Private Network Between Portable Device and Enterprise Network," which was filed Jan. 22, 2001, and which is incorporated herein by reference in its entirety.

The tunneling component of the corporate network 12 in the present discussion is characterized as a corporate client that is located on a computer server or similar component within the corporate network. The present invention is not so limited, however. Indeed, in one embodiment, the tunneling component can be implemented as a desktop client located on a desktop computer within the corporate network 12. In such an implementation, the desktop client can reside as a WIN 32 application on the computer, for example. The example illustrated in FIG. 1 is therefore exemplary with regard to the variations possible with this component of the present system.

Figure 2:
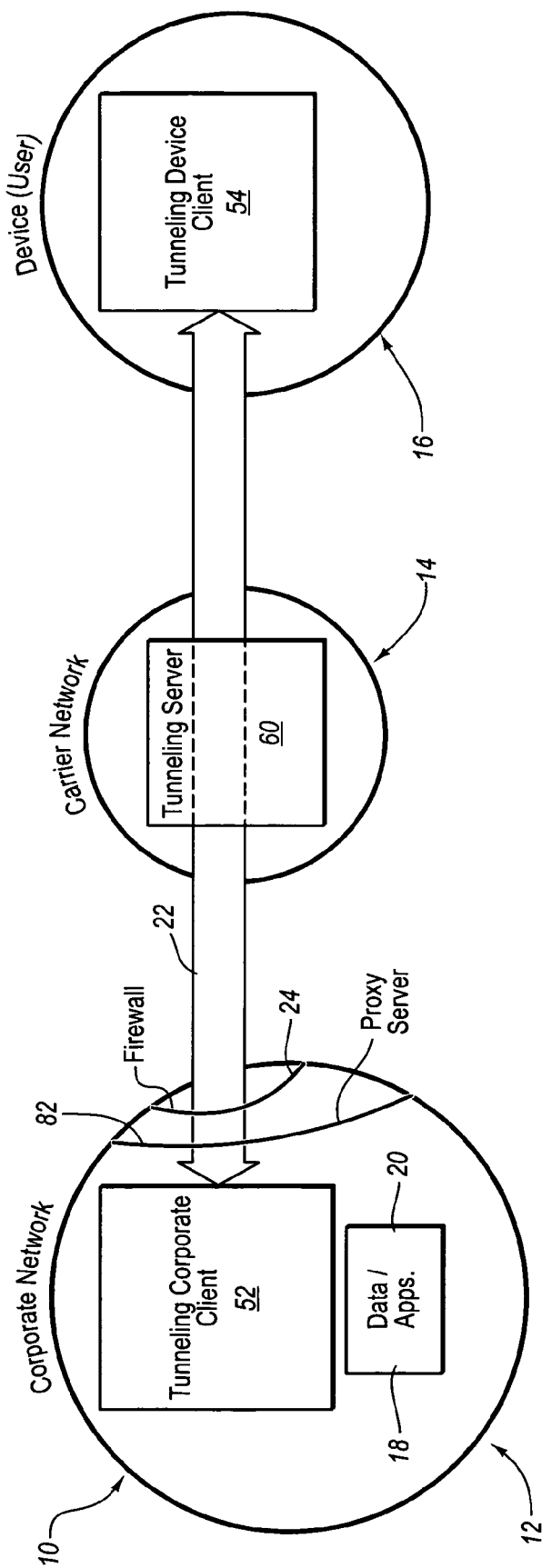
FIG. 2 is a block diagram showing the system of FIG. 1 in a second state according to one embodiment of the present invention.

Reference is now made to FIG. 2, which shows the data tunnel 22 established from the corporate client 52 of the corporate network 12 to the device client 54 of the remote device 16. As will be explained, the formation of the data tunnel leg 22A between the corporate client 52 and the tunneling server 60 of the carrier network 14, and the data tunnel leg 22B between the tunneling server 60 and the device client 54 via the connection signal/connection signal reply interaction discussed above, enables the tunneling server 60 to broker the linkage of the two data tunnel legs and operatively form the complete data tunnel 22 from the corporate network 12 to the remote device 16. The data tunnel 22 enables secure data transfer to occur between the remote device 16 and the corporate network 12, and more specifically, between and through tunneling-enabled devices, such as the corporate client 52, the device client 54, and the tunneling server 60. It is appreciated that in presently preferred embodiments, access between the corporate client 52 and the carrier network 14, and between the carrier network and the device client 16 is implemented, either wholly or partially, via the Internet. By extension, therefore, each of the above components is configured to transmit and receive data via the Internet.

The corporate client 52 and device client 54 monitor their respective tunnel legs 22A and 22B to ensure that the tunnel 22 remains open when needed. If for any reason the tunnel leg 22A or 22B is undesirably closed, the respective client opens a new data tunnel leg with the tunneling server 60 of the carrier network 14 by transmitting a new connection signal to the carrier network 14. Once a new tunnel leg is established, the tunneling server 60 brokers the linkage of the tunnel leg between itself and the respective client with the previously established tunnel leg of the other client. Although several acts are described herein as being specifically performed by the corporate client 52 or the device client 54, it should be appreciated that inasmuch as the corporate network 12 includes the corporate client, and inasmuch as the remote device 16 includes the device client, any acts performed by the corporate client are also acts performed by the corporate network, and acts performed by the device client are also acts performed by the remote device. In an alternative embodiment, the tunneling server 60 specifically monitors the data tunnel leg 22A and merely notifies the corporate network 12 if the leg is closed or lost for some reason. The corporate network 12 can then take steps to reestablish the data tunnel leg 22A.

The data tunnel 22 between the corporate client 52 and the device client 54 in various embodiments preferably uses the User Datagram Protocol ("UDP") as further described hereinbelow. In addition, embodiment of the invention may also use transmission control protocol/internet protocol ("TCP/IP"), hypertext transfer protocol with secure sockets layer protocol ("HTTPS"), IP security protocol ("IPsec"), or other appropriate protocols for data transfer. Using these protocols, connection signals, network data, connection signal replies, and other access requests are encrypted in packets and transmitted through the data tunnel 22 using "port 443" (not shown) of the corporate network 12. Port 443 is typically open to enable users to access the Internet from the corporate network 12, within the firewall 24.

As described, the present invention uses preexisting open ports in the firewall infrastructure to enable secure, VPN-related communication from remote mobile locations. Accordingly, it should also be appreciated that the present invention is an improvement over the prior art because additional ports are not required to be opened in the firewall infrastructure, which would require the use of traditional VPN hardware and software that is expensive and time-consuming to install and to maintain. Furthermore, the present invention enables a proxy server to filter any data packets transmitted through the ports to ensure compliance with the defined protocols.

Figure 3:
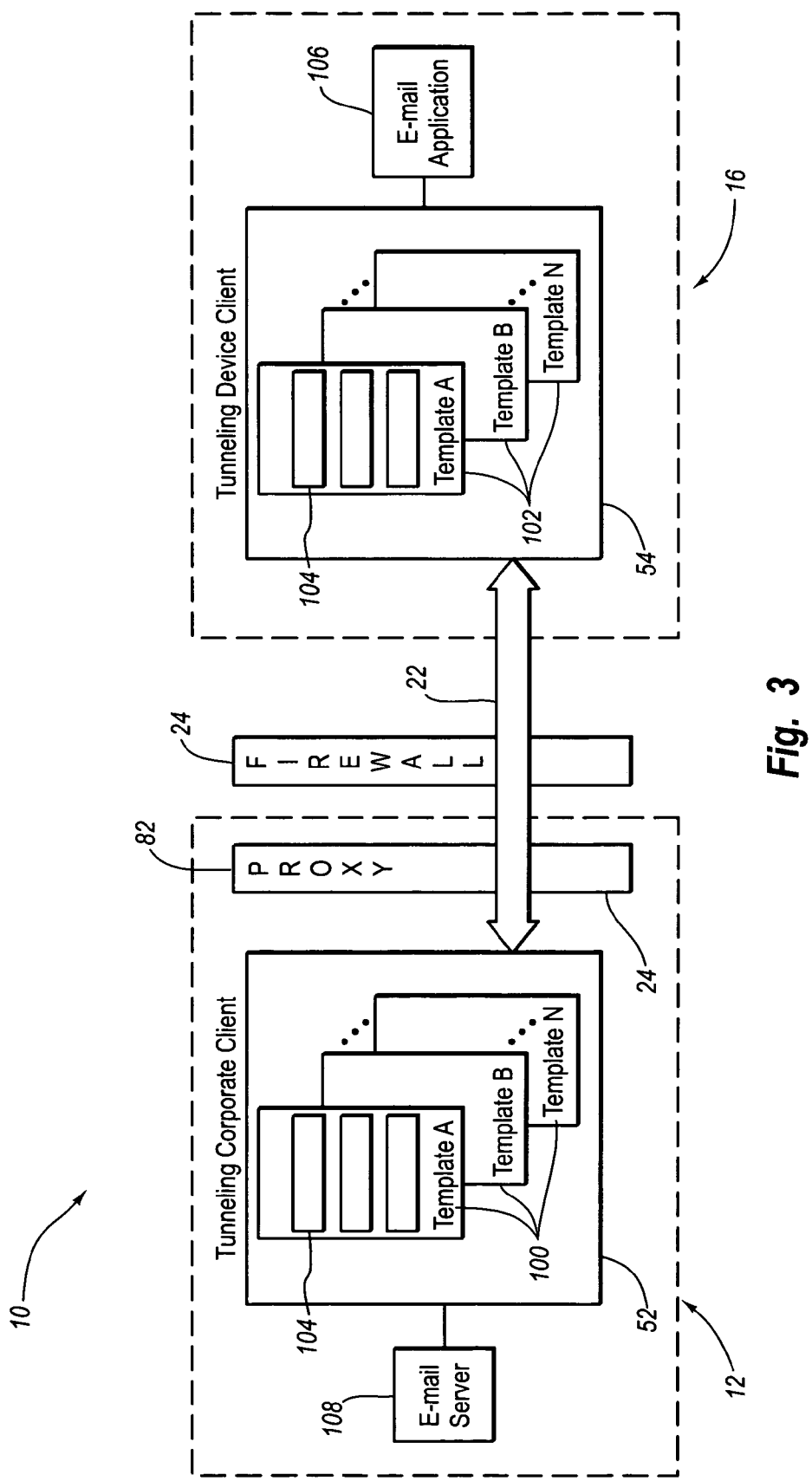
FIG. 3 is a block diagram of several of the components shown in FIG. 1, including protocol templates that are employed therein.

Reference is now made to FIG. 3, which depicts various details relating to the corporate client 52 and the device client 54. For clarity, some other components comprising the system 10 in this and following figures have been omitted. As illustrated, both the corporate client 52 and the device client 54 include a plurality of software templates 100 and 102, respectively. Each template 100 and 102 is configured for a specific protocol used in transmitting data between the corporate client 52 and the device client 54. Accordingly, FIG. 3 shows a plurality of N templates 100, designated template 100A, 100B, . . . , 100N, disposed in the corporate client 52. Similarly, the device client 54 includes N templates designated 102A, 102B, . . . , 102N. Each similarly designated template pair in the corporate client 52 and device client 54 is identical as to the protocol each template represents, (e.g., the protocol format contained in template 100D (such as Instant Messenger protocol) is identical to that contained in template 102D, which also pertains to the Instant Messenger protocol). Despite this similarity, in one embodiment each template 100 located in the corporate client 52 contains the actual protocol code, while the templates 102 located in the device client 54, though identical in protocol format, only contain the protocol formatting and not the actual protocol code. This is done so as to preserve the limited memory and processing resources of the remote device 16.

The templates 100, 102 are employed to assist the transfer of information, such as application data, commands, etc., between the corporate client 52 and the device client 54. Specifically, each template 100, 102 enables data transfer according to a specific communication protocol, as already mentioned. To that end, each template 100 and 102 further includes one or more inflection points 104 that correspond to commands or other data aspects that are unique to the respective protocol.

For instance, a template pair 100A/102A can be configured to correspond to a POP e-mail protocol used in transferring e-mail commands and/or data between the corporate network 12 and the remote device 16. As such, each template 100A and 102A will include a plurality of inflection points 104 that can contain the various commands and data specific to the POP protocol. This enables the templates 100A and 102A to be utilized in transmitting POP e-mail data between a POP-based e-mail application 106 disposed in the remote device 16, and a POP e-mail server 108 at the corporate network 12, both of which are shown in FIG. 3.

In another example, a template pair 100/102 can be configured that corresponds to the Instant Messenger protocol, which includes four main tasks that can be executed by the instant messenger application: send a message, receive a message, retrieve a buddy list, and login. Accordingly, the template pair 100/102 corresponding to the instant messenger protocol contains at least four inflection points, each corresponding to one of the four tasks above that can be performed by the instant messenger application. Template pairs 100/102 can be readily modified or added so as to accommodate new protocols or inflection points that are introduced within the present system 10 as described herein.

The corresponding pair of templates 100 and 102 can be configured to correspond to any one of a variety of protocols; thus the examples illustrating both the type and number of templates as given herein are meant to be merely exemplary. Further, though FIG. 3 illustrates an e-mail application 106 being associated with the remote device 16 and an e-mail server 108 associated with the corporate network 12, it should be appreciated that a wide range of applications and/or programs can be utilized in connection with the present system for enabling secure communications between a corporate network and a remote device.

2. Remote Access to Network Data

Reference is now made to FIGS. 2 and 3 together. The system and environment just described is suitable for practicing the methods of the present invention for enabling secure data intercourse between a remote device and a corporate network through a tunneling virtual private network arrangement. According to these methods, a user wishing to remotely access network data, such as the e-mail information contained on the e-mail server 108 of the corporate network 12, opens a line of communication, or the data tunnel leg 22B, with the carrier network 14 using the remote device 16, which in this example comprises a web-enabled PDA. The data tunnel leg 22B is established using the connection signal connection signal reply mechanism for establishing connectivity between the remote device 16 and the carrier network 14, as described above. Concurrent with or prior to the establishment of the data tunnel leg 22B, the data tunnel leg 22A is established between the corporate network 12 and the carrier network 14 using the same connection signal/connection signal reply routine discussed above.

Additional device and user authentication and security procedures that ensure that the system is properly configured and that all users and system components are properly authorized may be included. Specifically, a three-tiered regimen is utilized to accomplish the authentication and security tasks. The first tier comprises device authentication tasks for authenticating both the remote device 16 and the corporate network 12. When either the remote device 16 or the corporate network 12 attempts to establish a data tunnel leg with the tunneling server 60, its respective client transmits, along with or following the connection signal 50A or 50B, an identification code, such as a client identification ("CID"). The CID is an encrypted certificate that authenticates the corresponding client as one that is valid for transacting data with the present system 10. Upon receipt of the CID, the tunneling server 60 can authenticate that client, and hence its host (i.e., the corporate client 12 or the remote device 16) as a component of the system 10. As will be seen, the CID of each client 52 and 54 will be used in later tiers in connecting the data tunnel legs 22A and 22B into a single data tunnel 22.

As mentioned, the transmittal of the CID and related data from either of the device 52 and 54 to the tunneling server 60 is encrypted. In the present embodiment, this encryption is accomplished using x.509 certificates. The x.509 certificate can be used as a digital signature to ensure the various components to be used in transacting data within the system via the tunneling server 60 are valid devices. In one embodiment, the tunneling server 60 is pre-loaded with the required digital signature and certificate data during manufacture so as to enable the tunneling server 60 to validate these digital signatures later during operation.

As a result of the first tier device authentication procedure above being completed, data tunnel legs 22A and 22B are established between each device 52 and 54 and the tunneling server 60. Before the complete data tunnel 22 is formed and data can be transacted between the corporate network 12 and the remote device 16, however, the other two tiers of the security and authentication tasking must also be completed. In the second tier, various security procedures are performed to enable secure data transfer. First, a session key is created for use by the corporate client 52 and the device client 54. In the present embodiment, this step is performed using an RSA algorithm, which creates a 2,048-bit session key. These steps are preferably performed by the device client 54 of the remote device 16 and transmitted via the tunneling server 60 to the corporate network 12, where the session key is received by the corporate client 52. In alternative embodiments other components, such as the corporate client 52, can create the session key.

After the session key is created, it is used to set up the encryption protocol that will be used during data transmission between the corporate network 12 and the remote device 16. In the present embodiment, RC-4 techniques are used to set up the data encryption based on the session key. Then, a message digest, such as MD-5, is used to ensure that the encryption is accurately performed and is not corrupted by extraneous events.

As a result of these various security devices and algorithms, secure encryption of data to be transmitted between the various components is ensured. At this point, the x.509 certificate created in the first tier is terminated, and the full data tunnel 22 from corporate network 12 to remote device 16 is established by the tunneling server 60, as shown in FIGS. 2 and 3.

Once the complete data tunnel 22 is established, the third tier of the security and authentication regimen can be executed, wherein the corporate network 12 authenticates the identity of the user of the remote device 16 to verify that the user has authority to access the corporate network before data is transacted. In one embodiment, the user's identity is authenticated when the user enters a personal identification number. In another embodiment, the user's identity is confirmed over the Internet using encryption technology, such as twin-key encryption, with corresponding public and private keys assigned to the user. Those skilled in the art will recognize there are various methods for authenticating the identity of a user, any of which may be used in accordance with the present invention. Other such methods for authenticating the identity of a user include, but are not limited to, tokens and smart cards. More details concerning user authentication are given further below.

It is appreciated that, despite the details given herein, other methods can be used to provide the security and authentication results obtained by the above three-tiered regimen. Additionally, any one of the three tiers can be substituted with an alternative procedure that substantially accomplishes the same task. Finally, though all three tiers are preferably practiced in connection with the present invention, it is appreciated that less than three tiers—or, alternatively, more than three tiers—can be utilized in establishing the present system 10 for secure data exchange.

Once all three security and authentication tiers are satisfied, the user, by way of the device client 54 of the remote device 16, can transmit along the data tunnel 22 an access request to the corporate network 12 (via the tunneling server 60), which is received by the corporate client 52. The access request can include any request requiring access to network data 18 or applications 20. For example, the access request can include a request to receive access to email messages, web pages, document files, or other data of the corporate network 12. As illustrated in FIG. 3, the e-mail application 106 of the remote device can issue an access request via the device client 54 to receive e-mail information from the e-mail server of the corporate network 12. As such, the access request is packetized by the device client 54 of the remote device 16 and transmitted using data tunnel 22.

It is noted here that once the data tunnel 22 is established and all authentication and security procedures have been met, the tunneling server 60 preferably does not interact with (i.e., caching, transcoding, decrypting, etc.) access requests, access replies, or any other data being transferred between the remote device 16 and the corporate network 12, but merely enables the data transfer to pass through it.

Like the connection signals 50, the keep alive signal 51, and the connection signal replies 53 discussed above, the access request transmitted by the device client 54 in the present embodiment comprises a protocol structure that enables it to be transmitted as web traffic. In particular, each packet comprising the access request includes an http header or similar protocol identifier that will cause the firewall 24 and the proxy 82 to recognize the packet as web traffic and allow its passage through the designated port of the corporate network 12, in this case, port 443. An underlying protocol, such as IPSec, also resides in the packet and contains the actual data pertaining to the access request. This arrangement of the data packets comprising the access it request transmitted by the device client 54 thus allows them to pass through a port already open for such traffic, thereby avoiding the need to open yet another port through the firewall 24. Any packets comprising the response by the corporate client 52 to the access request of the device client 54 are also packaged in this manner such that they too pass freely through the firewall 24, as will be seen.

The above access request, originally produced by an application and sent by the device client 54 of the remote device 16, is transmitted via the data tunnel 22 using the corresponding template 102 of the device client 54. For example, the access request can pertain to a request for e-mail header information to be used by the e-mail application 106 of the remote device 16. As such, the access request is transmitted using the template 102A pertaining to such an e-mail header request. The inflection points 104 of the template 102A correspond to such an e-mail header request. Again, the access request can comprise any one of a variety of request types, and the templates 100 and 102 can be configured to pertain to one of these types. It is noted that, in this configuration, the e-mail application 106 of the device client 54 interprets the template 102 as representing the application or server that is actually located in the corporate network 14. As such, the template 102 acts as a "proxy" for that corporate application or server, in this case, the e-mail server 108.

As seen in FIG. 3, the templated access request transmitted by the device client 54 is received via the data tunnel 22 by the corporate client 52 after passing through the tunneling server 60, the proxy server 82, and the firewall 24. Again, because the access request is transmitted in preferred embodiments in a web traffic configuration, the firewall 24 allows it to pass through a port already open for such traffic, thereby avoiding the need to open yet another port therethrough.

The corporate client 52 then matches the access request to the appropriate template 100 before forwarding it to the designated application in the corporate network 12. For instance, continuing the above example, the e-mail header access request sent from the device client 54 is received at the corporate client 52 and is matched to the appropriate template 10A. The data contained in the inflection points 104 of the template 100A are then extracted and sent to the e-mail server 108, where the access request is processed and the requested data is forwarded to corporate client 52 in response to the access request. As was the case with the device client 54, the e-mail server 108 interprets the template 100A as representing the e-mail application 106 that is actually remotely located in the remote device 16. Thus the template 100A acts as a proxy for the e-mail application 106.

The manner in which the access request is responded to can be defined and/or limited by the corporate network 12. By allowing the corporate network 12 to control what acts are performed in response to the access request, the corporate network is able to maintain control over access to network data and applications and can control how these network elements are manipulated within the network. Predefined acts can include, but are not limited to, retrieving email headers, retrieving email message bodies, retrieving web page data, deleting email, faxing email data or web page data to the user, and transmitting other network data between the corporate client 52 and device client 54.

Once received by the corporate client 52, the data is packetized as an access response to the access request according to an appropriate template 100. The templated access response is then forwarded via the data tunnel 22 for receipt by the device client 54 in a similar manner to that described above. In one embodiment, the access response can be incorporated into the continual connection signal string being continually sent by the corporate client 52 to maintain the data tunnel leg 22A open, as described earlier.

In one embodiment, the transmission of data contained in an access response is performed via the data tunnel 22. In another embodiment, a second data tunnel (not shown) is established for the transmission of the access response. It is to be remembered that these data tunnels cooperate with the corporate client 52, the device client 54, and the tunneling server 60 in a tunneling configuration in enabling the secure transmission of data between the corporate network 12 and the remote device 16. In the case where a second data tunnel is implemented for data transfer, the second data tunnel can be established through the same port used for the data tunnel 22 (e.g., Internet port 80, port 443) or through a separate port.

In one embodiment, a null template pair (not shown) can be designated in the templates 100 and 102. The null template pair can be configured to capture and transmit data between the corporate client 52 and the device client 54 that has been compared with the other templates 100 or 102 of the corporate or device client and does not match with any of those templates. Such unmatched data can then be captured by the null template on either the corporate client side or the device client side and transmitted over to the null template of the other client. The respective client 54 can then forward the data according to pre-defined procedures. In this configuration, the null templates enable the tunneling system to operate similar to a traditional VPN configuration, wherein data is not collected and assigned according to protocol templates 100 and 102.

It should be noted that more than one remote device can be utilized in connection with the corporate network 12 at any given time. Thus, the illustration of one remote device is merely exemplary. Similarly, multiple corporate clients disposed in one or more corporate networks can be utilized in accordance with the present teachings while still residing within the scope of this invention.

Figure 4C:
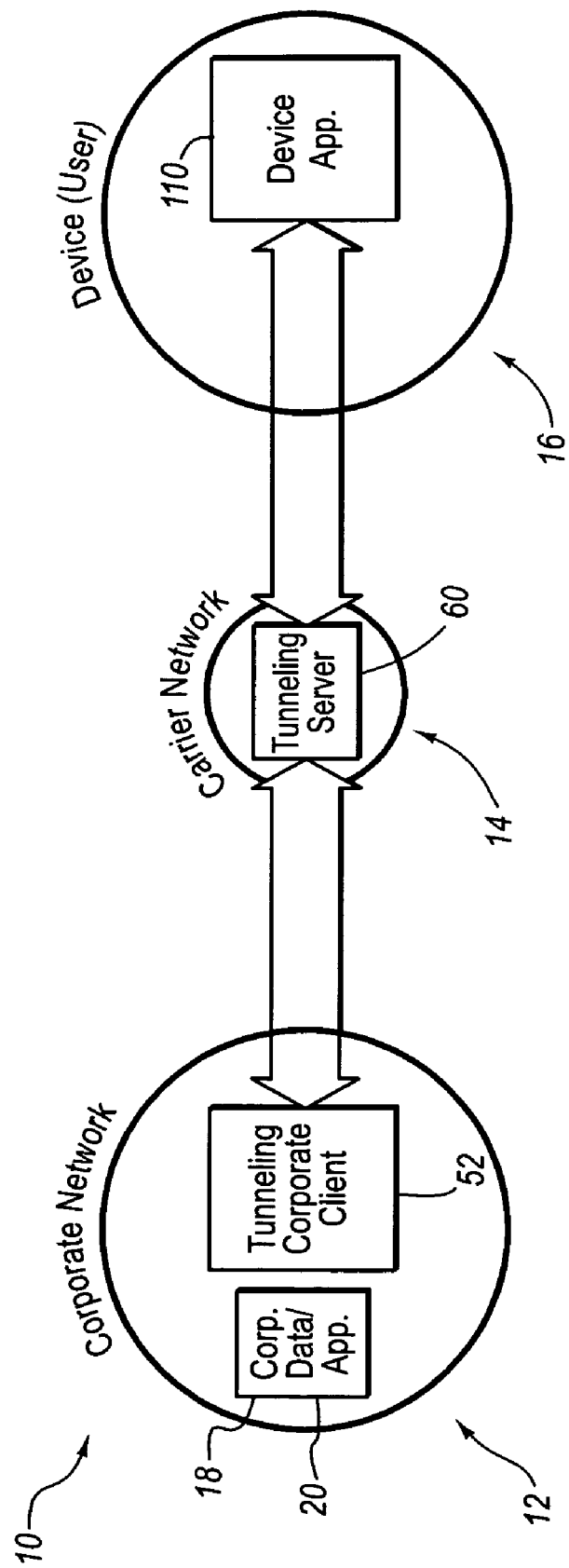
FIG. 4C is a block diagram depicting the operational relationship between local and remotes devices according to yet another embodiment.

Reference is now made to FIGS. 4A, 4B, and 4C in describing various techniques by which implementation of the present invention into network systems can be achieved. Note that the implementations to be described are merely exemplary; as such, other means of implementation can also be employed. In the first two implementations given below with respect to FIGS. 4A and 4B, it is noted that full encryption technology is preferably employed from device client 54 to corporate client 52 in order to secure the communications transmitted therebetween.

In FIG. 4A, a first means of implementation is depicted, wherein the device client 54 of the present system 10 is compiled into a device application 110 of the remote device 16. The corporate client 52 is disposed in a software configuration within the corporate network 12 as previously discussed. Thus, both the device client 54 and corporate client 52 are implemented as software modules in the corporate network 12 and remote device 16, respectively.

In FIG. 4B, both the corporate client 52 and the device client 54 are implemented as software modules, similar to FIG. 4A. In contrast to FIG. 4A, however, the present embodiment implements the device client 54 as a discrete software module being separately positioned with respect to the one or more device applications 110 that are located within the remote device 16. As before, the corporate client 52 resides as a software module within the corporate network 12. In this implementation, the device client 54 interacts with the device application 110 by implementing a port listener scheme by which the device client continuously monitors the port through which commands and data from the device application are sent and received. Once detected, this command and data information is intercepted by the device client 54 and manipulated for inclusion into an appropriate template 102 before being transmitted to the corporate client 52 via the carrier network 14 and tunneling server 60, as described earlier.

In FIG. 4C a third implementation is depicted, wherein a user interface, such as a user interface service ("UIS") is employed. Here, the UIS, in the form of a wireless application protocol ("WAP") browser, interacts with an application protocol from the corporate client 52 or device client 54 via the respective protocol template 100 and/or 102. As seen in FIG. 4C, for example, requested data from the corporate database 18 or application 20 is encrypted and forwarded by the corporate network 12 to the tunneling server 60 of the carrier network 14, again, using the template scheme discussed earlier. The tunneling server 60 or other component of the carrier network 14 then renders this data in a visual format before forwarding it on to the remote device 16. The device client 54 of the remote device 16 decrypts the visual data and further processes it as needed or desired. This embodiment can be implemented, among other things, in systems employing the WAP protocol, such as e-mail service for WAP-enabled mobile phones, for instance. Also, in embodiments incorporating the present UIS configuration, the UIS is normally located with the tunneling server 60 at the carrier network 14. In such embodiments, the UIS can contribute security features to enhance those already associated with the present invention, if desired. For instance, in a UIS implementation employing WAP protocol, WTLS, which is a WAP-related security program, can be utilized to provide data protection and integrity.

3. Protocol Mapping

Figure 5:
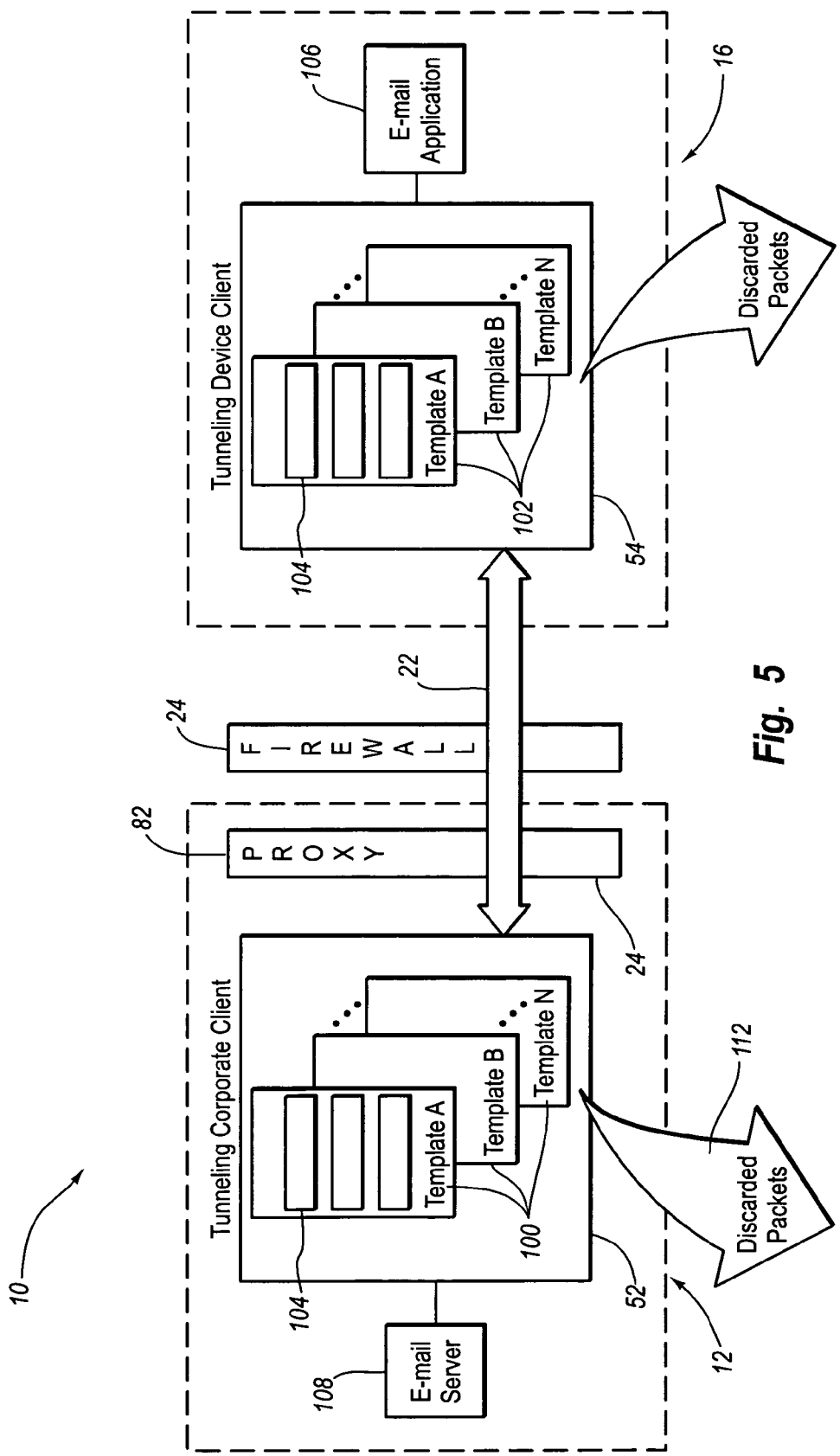
FIG. 5 is a block diagram illustrating various components of the present system according to one embodiment, including various protocol templates employed therewith.

Reference is now made to FIG. 5, which depicts another embodiment of the present invention. The system 10 for enabling secure communication as described above can be employed to enable data transfer between the corporate network 12 and the remote device over differing protocols. FIG. 5 shows that, as before, the corporate client 52 and the device client 54 include a set of templates 100 and 102, respectively. In the present embodiment, the corporate client 52 and the device client 54 are configured to map the inflection points 104 of one template 100/102 (pertaining to a given protocol) to the inflection points 104 of another template 102/100 that pertain to a differing protocol. This feature allows data of one protocol format to be switched, or mapped, to represent the data in another, differing protocol format. Thus, traditionally non-corresponding protocol data transfers between the corporate network 12 and the remote device 16 are enabled while preserving the encrypted features of the tunnel.

In a non-limiting example of the present embodiment, FIG. 5 shows the e-mail application 106 of the remote device 16 in communication with the device client 54. Likewise, the e-mail server 108 of the corporate network 12 is shown in communication with the corporate client 52. The e-mail application 106 in this example corresponds to the POP protocol, while the e-mail server 108 corresponds to the MAPI protocol. Thus, the two protocols are dissimilar in their ability to directly communicate with one another. The present embodiment resolves this dissimilarity by mapping from one protocol to the other. Exemplary, a "retrieve e-mail message headers" command from the e-mail application 106 is received by the device client 54 and fitted to the appropriate template, in this example, POP template 102B. The template 102B contains inflection points 104, including at least one inflection point for containing the POP command to retrieve e-mail message headers that are stored in the e-mail server 108. The templated command is then sent via the data tunnel 22 to the corporate client 54 of the corporate network 12 as an access request in the manner described above.

Once the templated command is received, the corporate client 52 employs its mapping feature to match the inflection points 104 of the templated POP command to those of a template 100 that corresponds to the MAPI protocol of the e-mail server 108, which is the intended target of the command. Thus, the corporate client 52 maps the command into the template 100A, which corresponds to the MAPI protocol of the e-mail server 108. The mapped, templated command to retrieve e-mail message headers is then forwarded to the e-mail server 108 in MAPI protocol format, where it is understood and acted on by the server. An access response containing the requested information is then prepared by the e-mail server 108 and forwarded to the corporate client 52, where a similar mapping process is followed to convert the access response data to POP protocol format for receipt by the e-mail application 106 via the device client 54.

As performed in the above example, the corporate client is preferably used for the mapping of the various protocols, though either or both clients can be configured to accomplish such mapping. When a specified client is used to perform the mapping, the other client generally acts as a pass-through conduit for the mapped command to arrive at the intended application or server.

Many applications can benefit from the above mapping embodiment. Indeed, in addition to e-mail applications, data synchronization applications such as Active Sync and Hot Sync that are typically used for updating data on a PDA from another data storage location, are further examples of the applicability of this mapping feature. Correspondingly, the examples specified herein are not meant to limit the present invention in any way.

4. Protocol Buffering

Yet another embodiment of the present invention is shown in FIG. 5. A buffering feature can be implemented with the protocol mapping feature of the present invention to accommodate mapping between protocols when certain complicating circumstances arise. In one circumstance, transient conditions occurring along the communication route defined by the data tunnel 22 and other components can temporarily interrupt the stream of data transmitted between the corporate network 12 and the remote device 16. If this occurs, a specified template of the template pair 100/102 can temporarily suspend the transmission of the data and instead store the data within the template itself until the transient conditions along the communication route are resolved and the data tunnel 22 is reestablished. Then the specified template can resume data transmission, sending the data that was temporarily buffered therein. In this way, no data is lost due to temporary interruptions in the connection between the corporate client 52 and the device client 54.

In a second circumstance, the protocol buffering feature of the present invention enables proper delivery of data packets. In some delivery systems used in connection with the present system, the order of data packets can be mixed up during transmission between the corporate network 12 and the remote device 16. Additionally, some packets may arrive later than other packets, creating further disorder. If either or both of these situations occur, the corresponding template 100/102 that is located on the receiving end of the of data packets (i.e., located in either the corporate client 52 or the device client 54) can receive the dis-ordered group of packets as they arrive and hold them until all the packets necessary to form a consecutive packet arrangement are received. The template 100/102, in connection with the corresponding client 52 or 54, can then arrange and deliver the packets in an ordered sequence to the appropriate device for processing, as already described. For example, an application located in the remote device 16 can transmit, via the template 102A of the device client 54, five data packets, ordered 1-5, to the corporate client 52. The template 100A of the corporate client 52 receives four of the data packets in a dis-ordered and incomplete sequence, namely, 1, 2, 5, and 4. The template 100A, having received this packet stream then buffers the packets before forwarding them to the proper application, while awaiting the arrival of the third data packet. Once packet #3 arrives, the template 100A, in connection with the corporate client 52, arranges the packets into the proper 1-5 order, then forwards them to the corresponding application. In this way, communication routes or methods that would otherwise prevent the ordered transmission and receipt of data packets are compensated for and corrected by the buffering capability of the templates of the present invention. Further, this ability ensures that the applications of the corporate network 12 and remote device 16 that use the data stream function properly.

5. Protocol Filtering

Reference is again made to FIG. 5. According to another feature of the present invention, the system 10 for enabling secure communication can be utilized as a protocol filtering tool. As data packets are received by either the corporate client 52 or the device client 54 via the data tunnel 22, they are matched by the respective client against its protocol templates 100 or 102. If the data packets match a particular protocol template 100 or 102, they are input into that template and processed as already described further above. If no matching template 100 or 102 is found for a particular data packet, however, the present system can reject the data packet and delete it from the system, as indicated by the arrows 112 in FIG. 5. This deletion can occur at the corporate client 52, the device client 54, or both. In one embodiment, this filtering function occurs at the corporate client 52, where more system computing capacity and memory is located. The filtering capability described here enables the system 10 to act in an auxiliary firewall capacity by rejecting those data packets, such as hacker-related and malicious packets, that do not fit within pre-configured data templates, thereby enhancing security within the system.

It should be remembered that any combination of one or more of the embodiments described above (i.e., protocol enablement, mapping, buffering, filtering) can be configured to operate within the present system, according the systems needs and user preferences.

6. Tunneling Network Pipe with Guaranteed Enhanced UDP

Figure 6:
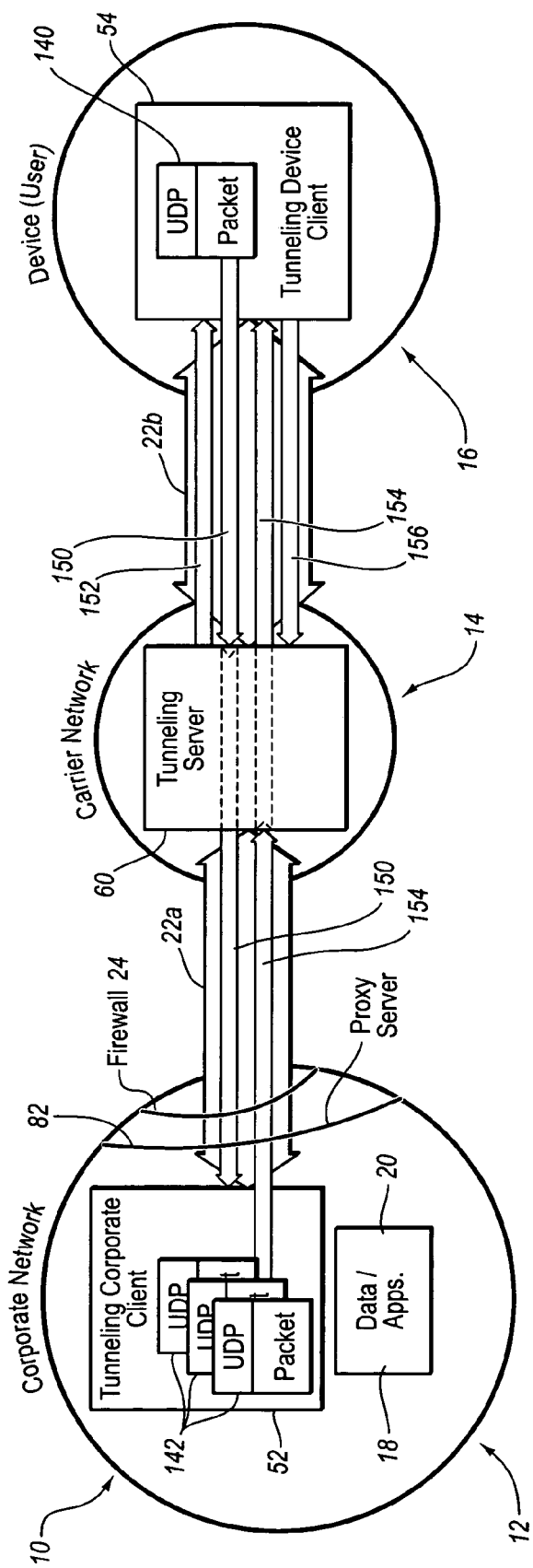
FIG. 6 is another block diagram illustrating various components of the present system according to one embodiment.

Referring now to FIG. 6, the present invention provides methods and systems that enable the use of the User Datagram Protocol (UDP) in providing secure communications in virtual private networks, the system being generally designated at 10. As with previous embodiments, system 10 generally comprises a corporate network 12, a carrier network 14, and a remote device 16. In particular, FIG. 6 illustrates systems and methods of the present invention for enabling a user of the remote device 16 to access network data 18 and/or one or more software applications 20 of the corporate network 12 through the transmission of UDP-formatted packets over data tunnel 22. Although data tunnel is shown as having data tunnel legs 22A and 22B, it will be appreciated that data tunnel leg 22B may be omitted in the event that UDP-formatted packets are sent and received between carrier network 14 and device 16 in a non-tunneling environment.

UDP is a protocol that, like TCP, runs on top of IP networks. Unlike TCP/IP, conventional UDP/IP offers only the minimal transport service of non-guaranteed packet delivery. UDP provides very few error recovery services, offering instead a direct way to send and receive packets over an IP network. As such, UDP is used primarily for broadcasting messages over a network but is generally considered inadequate for communications that need to be reliable. According to the invention, however, the very nature of UDP that makes it less reliable, its connectionless nature and the fact that UDP is a "minimal transport service," also makes it ideally suited for use on a wireless network. This is because UDP does not require nearly the amount of network overhead that TCP does. This reduces bandwidth requirements significantly.

As indicated by arrow 150 in FIG. 6, a request to access network data and or application is created by device 16 and/or tunneling client 54 as one or more UDP-formatted data packets 140. These packets 140 are transmitted to tunneling server 60, as indicated by arrow 150, which in turn relays the packets to tunneling client 52 through data tunnel leg 22A. Upon validating the identity of the user and approving the data access request, the corporate network 12 and/or tunneling client 52 generates one or more UDP-formatted data packets 142, which contain the requested data. These packets 142 are transmitted to the tunneling server 60 through data tunnel leg 22A and then relayed to the device 16, as indicated by arrow 154.

As previously noted, however, current UDP technology is unreliable if used exclusively in this manner. Therefore, in order to make UDP data delivery reliable over IP networks such as wireless networks or the Internet, a number of enhanced features are provided by a unique combination of features according to the invention. One of these embodiments is guaranteed packet delivery. To accomplish guaranteed packet delivery, each packet that is sent by a source component is confirmed by the receiving component. If the source component does not receive a confirmation within a specified time period then a copy of the original packet is re-sent by the source. This pattern continues until a confirmation from the receiving component is received by the source component for the packet or a specified maximum re-sends has been attempted by the source component.

This process is depicted in FIG. 6 by arrows 152 and 156. Upon tunneling server 60 receiving UDP-formatted packet 140, a confirmation signal is sent to the device 54, as indicated by arrow 152, so that the device 54 can verify the packet was accurately transmitted. If not, the packet can be promptly resent. Similarly, upon tunneling client 54 receiving one or more of UDP-formatted packets 142, corresponding confirmation signals are sent to the tunneling server 60, as indicated by arrow 156, so that the tunneling server can verify that the packets are accurately transmitted. Of course, such confirmation signals can also be sent between the corporate network 12 and the tunneling server 60.

Another feature of the invention is guaranteed packet sequencing. Due to the connectionless nature of UDP it is possible that packets, e.g. packets 142, sent from the source component could be received in a different order by the receiving component. The tunneling clients on the computing network, carrier network, or remote device can therefore buffer packets as they are received and only delivery them to the target end of the tunnel in the original sequence that they were sent from the source end of the pipe. This process is further described in conjunction with FIG. 5 above, in the section titled, "Protocol Buffering."

In addition, a tunneling client can divide larger blocks of data into optimized pieces (chunks) so the pieces can be sent across a wireless network without being fragmented by the network. In effect, the tunneling client is preempting any fragmenting that would be done by a network in order to reduce network overhead. For example, the tunneling client can divide larger blocks of data into 512 byte chunks. In the example of FIG. 6, each of packets 142 would therefore be configured to has a size of 512 bytes. After these small chunks are delivered to the end of the tunnel, the chunks can be reassembled into a single packet that is then delivered to the target application at the end of the pipe.

In addition, dividing larger blocks of data into smaller pieces also provides the added benefit that large data chunks are prevented from dominating a secure channel between a tunneling switch (tunneling client on the carrier network) and a tunneling client. This is achieved as the data is automatically multiplexed through the tunneling switch across multiple instances of tunneling sessions.

Another advantageous feature of the invention that can optionally be implemented is smart buffering, which is essentially the opposite of fragmenting large data blocks. Smart buffering is used to further optimize communication between the remote endpoint and the switch and to minimize wireless network bandwidth usage. When a tunnel is created, each endpoint specifies a maximum packet size and a timeout value that indicates how long the tunnel should wait for more data to be added to the send buffer before executing the send. When an application sends data down the pipe, the data is actually temporarily added to a buffer and not sent down the pipe until one of two conditions are met: the buffer is full based on the maximum packet size value; or the timeout has expired for more data to be added to the buffer. Thus, whereas fragmenting large data blocks is used to reduce data blocks to an optimum size for transmission, smart buffering is used to create larger packets that are an optimum size for transmission.

In addition each UDP packet can include a checksum value that is the MD5 representation of the packet itself. This is used to verify the integrity of the packet at the target end and ensure that the packet was not corrupted during transmission or tampered with by a third-party during transmission.

Another feature that can advantageously be used by the tunneling clients to improve UDP data transmission is compression. In one embodiment, a form of LZW compression (LZW is a compression technique that is well known to those skilled in the art) is used to compress the data before it is transmitted through the pipe. The compression can be switched on and off depending on a user's preferences or the detected bandwidth availability. In addition, some data packets do not require compression because the data is already compressed. In these cases, the tunneling client can dynamically detect data that does not require compression and allows it to pass through without further compression.

Since many of the features of the tunneling systems result in a TCP style experience for the application, a TCP style application program interface (API) can be used to simplify implementation of the tunneling systems. This would simplify and standardized use and adoption of the technology.

Another embodiment of the invention is a software development kit (SDK) that enables users to quickly implement the embodiments of the invention. An SDK is a programming package that enables a programmer to develop applications for a specific platform. Typically an SDK includes one or more APIs, programming tools, and documentation. The SDKs according to the invention could include, for example: an application program interface module comprising a set of routines, protocols, and tools for building software applications, wherein the application program interface module presents a TCP style interface to a programmer; a UDP-header library including one or more headers for use by a programmer in developing an application that applies UDP formatting to data for transmission over a network; and a network communications module comprising code operable to perform any of the various methods of communications between remote and local devices or networks disclosed herein.

7. Simplified User Authentication

Figure 7:
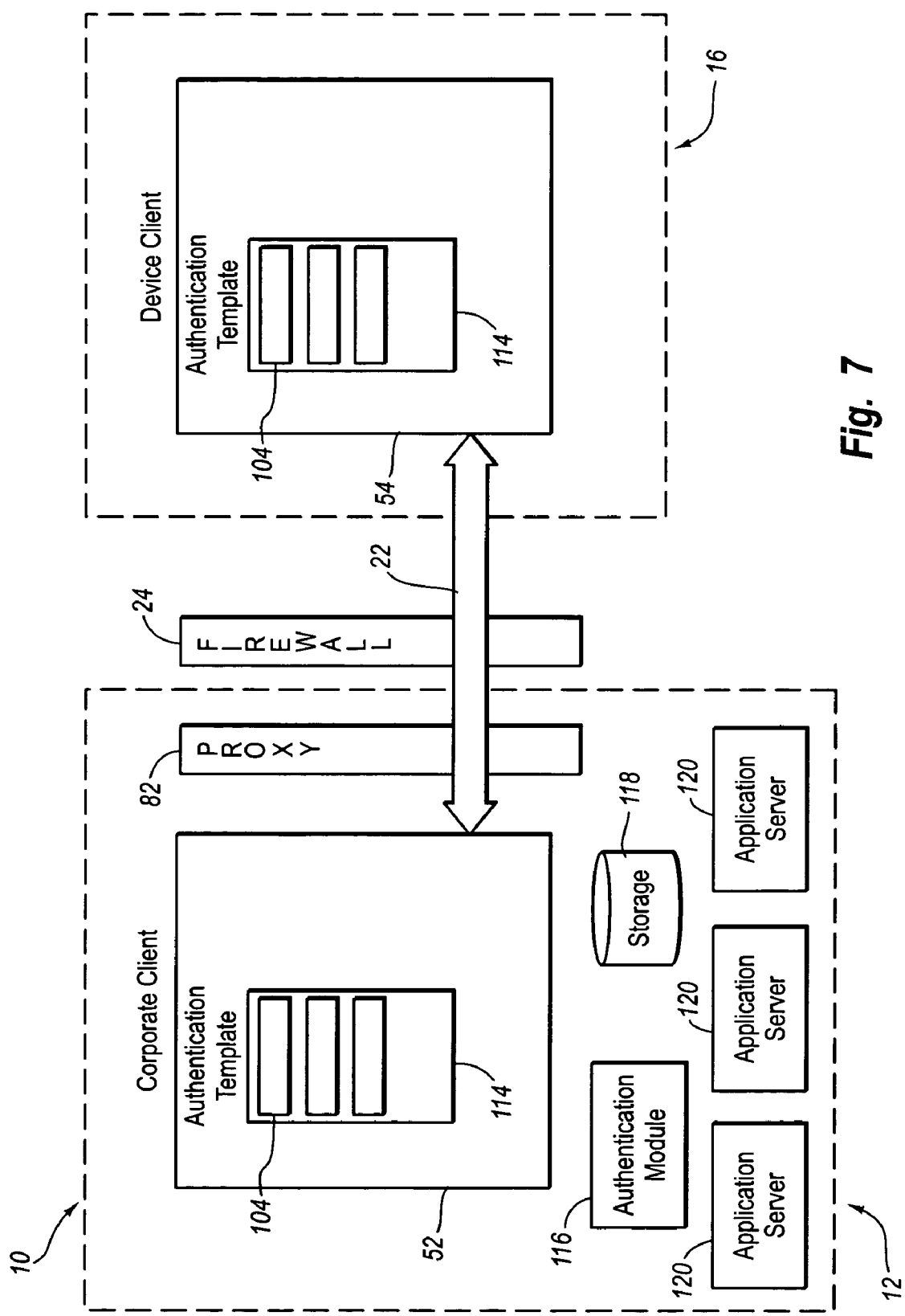
FIG. 7 is a block diagram illustrating various user authentication components of the present invention according to one embodiment.

Reference is now made to FIG. 7, depicting yet another embodiment of the present invention. As already mentioned, the data tunnel 22 is established by creating the data tunnel leg 22A from the corporate client 52 to the tunneling server 60, and the data tunnel leg 22B from the tunneling server 60 to the device client 54. The tunneling server 60 can then unite the two data tunnel legs 22A and 22B to form the complete data tunnel 22. Before enabling data to flow between the corporate client 52 and the device client 54, however, the corporate network 12 in executing the third tier of the three-tiered authentication and security regimen can require the user of the remote device 16 to be authenticated by the network. This can be accomplished by utilizing an authentication template pair 114, similar to the templates 100/102 described above. In one embodiment, the user enters appropriate security credentials, such as an NT domain password, radius security password, active security password, or custom password, into the device client 54. This security credential data is then input into the authentication template 114 of the device client 54. The templated security credential data is then forwarded via the data tunnel 22 to the corporate client 52, where it is received and input into the authentication template 114 of the corporate client. The security credential data is then forwarded to a security layer of the corporate network 12, including an authentication module 116, for user authentication. If authentication is successful, the security credential information can be preserved in a storage device 118, such as a 3DES encrypted database. Data can then be enabled by the corporate network 12 to flow between the corporate client 52 and the device client 54.

Once authentication by this or other similar method is accomplished, the security credential information can be synchronized by the corporate client 52 with the authentication/password requirements of other designated applications, such as application servers 120 in the corporate network 12 that the user of the remote device 16 may choose to access. This synchronization causes the user authentication requirements of each designated application server 120 to be met. This in turn enables the user to access the various applications without again having to enter appropriate security credential information, such as a password, for each application contained on the application servers 120, thereby streamlining and simplifying use of the network for the user. This synchronized authorization can be distributed as narrowly or as broadly as designated by the corporate network 12 and security administrator.

The present invention enables secure data transfer between remotely disposed components using a simplified connectivity infrastructure. This in turn enables data synchronization and access between a corporate network and a remote device. In particular, the synchronization of corporate data with remotely disposed devices, as well as the utilization and enablement of native device applications in conjunction with a corporate network, are provided for. It should be understood that, though the principles herein have been directed at implementation within a tunneling environment, these principles can also be largely applied to other data transport embodiments having varying hardware/software implementations, such as typical VPN configurations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
causing a data tunnel leg to be established between a carrier network and a tunneling client of a computing network;
receiving a first packet from a tunneling client of a remote device in a User Datagram Protocol, the first packet comprising a request for access to network data stored on the computing network;
directing, via a processor, transmission of a packet acknowledgement signal to the remote device, wherein the tunneling client of the remote device is configured to use the packet acknowledgement signal to confirm that the first packet was accurately transmitted;
directing transmission, via the data tunnel leg, of the first packet to the computing network;
receiving, from the tunneling client of the computing network, the requested network data as a set of User Datagram Protocol formatted packets in response to directing the transmission of the first packet to the computing network, wherein the set of packets has a defined sequence; and
directing transmission of at least a subset of the set of packets to the remote device such that each packet of the set is not received by the remote device in the defined sequence and enabling buffering of the packets of the subset within the tunneling client of the remote device as each of the packets of the subset is received by the tunneling client of the remote device; and
directing transmission of one or more packets that are next in order of the defined sequence to a target application in the remote device in a proper sequence, upon buffering one or more packets that are next in order of the defined sequence.

2. A method as defined in claim 1, further comprising:
receiving a second packet acknowledgement signal from the remote device acknowledging receipt of at least one packet of the set of requested network data packets, wherein the packet acknowledgement signal confirms that the at least one packet of the set of packets was accurately received.

3. A method as defined in claim 1, wherein the set of packets has a defined sequence, and the method further comprising:
buffering the packets within the carrier network as each of the packets is received by the carrier network, even though each packet of the set is not received by the carrier network in the defined sequence; and
directing transmission of the one or more packets that are next in order of the defined sequence to the remote device in the proper sequence, upon buffering one or more packets that are next in order of the defined sequence.

4. A method as defined in claim 1, wherein receiving comprises receiving the network data, through the data tunnel leg, which was added to a buffer in the computing network, wherein additional data also is configured to be added to the buffer for transmission and wherein prior to directing transmission of the set of packets, the method further comprises:
receiving the additional data, stored in the buffer, through the data tunnel leg as a packet upon either a defined maximum packet size being met or a defined timeout value expiring.

5. A method as defined in claim 1, wherein directing transmission of the first packet to the computing network enables the tunneling client of the computing network to dynamically detect whether the packet has been compressed and compress the packet before transmitting the packet through the data tunnel leg in an instance in which the packet has not been compressed.

6. A method as defined in claim 1, wherein the first packet comprises a portion of the request for access to network data, the method further comprising:
directing sending of the first packet across a wireless network without being fragmented by the network based at least in part on a size of the first packet.

7. A method as defined in claim 1, wherein the first packet further comprises a checksum value that is a message digest-5 representation of the packet and the method further comprises;
utilizing the checksum value to verify the integrity of the packet and ensure that the packet has not been corrupted or tampered with.

8. A method as defined in claim 1, wherein:
receiving the first packet comprises receiving the first packet that is encrypted by the tunneling client of the remote device; and
directing transmission of the first packet comprises directing transmission of the first packet to the computing network such that the tunneling client of the computing network decrypts the first packet.

9. A method as defined in claim 1, wherein establishing the data tunnel leg comprises assigning a session identification to the data tunnel leg that is known by the carrier network and the computing network, wherein the session identification identifies all transmissions through the data tunnel leg until the data tunnel leg is destroyed.

10. A computer program product comprising at least one non-transitory computer readable storage medium having computer-readable program code portions stored therein, the computer-readable program code portions comprising computer-executable instructions configured to perform:
   establishment of a data tunnel leg between a carrier network and a tunneling client of a computing network;
   receipt of a first packet from a tunneling client of a remote device in a User Datagram Protocol, the first packet comprising a request for access to network data stored on the computing network;
   transmission of a packet acknowledgement signal to the remote device, wherein the tunneling client of the remote device is configured to use the packet acknowledgement signal to confirm that the first packet was accurately transmitted;
   transmission, via the data tunnel leg, of the first packet to the computing network;
   receipt, from the tunneling client of the computing network, of the requested network data as a set of User Datagram Protocol formatted packets in response to directing the transmission of the first packet to the computing network, wherein the set of packets comprise a defined sequence;
   transmission of at least a subset of the packets of the set to the remote device such that each packet of the subset is not received by the remote device in the defined sequence and enable buffering of the packets of the subset within the tunneling client of the remote device as each of the packets of the subset is received by the tunneling client of the remote device; and
   transmission of one or more packets of the set that are next in order of the defined sequence to a target application in the remote device in a proper sequence, upon buffering the one or more packets that are next in order of the defined sequence.

11. A method comprising:
   directing transmission of a User Datagram Protocol formatted packet to a tunneling device on a carrier network, the packet comprising a request to access network data stored on a computing network, wherein a data tunnel leg has previously been established between the tunneling device and the computing network;
   receiving a packet acknowledgement signal from the tunneling device;
   utilizing, via a processor, the packet acknowledgement signal to confirm that the packet was accurately received by the tunneling device;
   receiving the requested network data from the computing network via the tunneling device in the form of one or more User Datagram Protocol formatted packets in response to directing the transmission of the packet to the tunneling device on the carrier network;
   directing transmission of a second packet acknowledgement signal to the tunneling device, wherein the tunneling device is configured to use the second packet acknowledgement signal to confirm that one of the one or more User Datagram Protocol formatted requested data packets was accurately transmitted, wherein the packets comprise a defined sequence;
   buffering at least a subset of the packets as each of the packets of the subset are received even though the packets are not necessarily received in the defined sequence;
   receiving one or more of the packets that are next in order of the defined sequence; and
   facilitating provision of the one or more packets that are next in order to a target application.

12. A method as defined in claim 11, wherein the data tunnel leg comprises a session identification that is known by the carrier network and the computing network, wherein the session identification identifies all transmissions through the data tunnel leg until the data tunnel leg is destroyed.

13. A method as defined in claim 11, further comprising:
   limiting a size of each packet; and
   directing sending of each packet across a wireless network without being fragmented by the wireless network based at least in part on the limited size of each packet.

14. A method comprising:
   causing establishment of a first data tunnel leg between a tunneling client of a computing network and a carrier network;
   causing establishment of a second data tunnel leg between the carrier network and a device;
   directing transmission of a packet acknowledgment signal to the device in response to receiving a first packet in a User Datagram Protocol, the device is configured to use the signal to confirm that the first packet was accurately transmitted and fit data in a first protocol format to a first template, the first template located in the tunneling client of the device and comprising one or more inflection points that correspond to commands or other data aspects of the first protocol;
   directing transmission of the first template comprising templated data to the computing network via the first data tunnel leg, in response to receipt of the first template from the device, and enabling the tunneling client of the computing network to generate a second template comprising one or more inflection points that correspond to commands or other data aspects of a second protocol in an instance in which the first template matches the second template, the inflection points of the first template match the inflection points of the second template, wherein data of the first protocol format is switched to represent the data in the second protocol format; and
   directing transmission of a plurality of packets to the second template to facilitate storage of each packet as each packet arrives, wherein the packets are not necessarily received in the ordered sequence in which they were formed, and wherein
   directing transmission comprises directing transmission to the second template of all of the plurality of packets necessary to form a consecutive packet which enables arrangement at the second template of the packets into an ordered sequence for delivery to one or more devices or an application in the computing network for processing.

15. An apparatus comprising:
   at least one processor; and
   at least one memory including computer program code, the at least one memory and the computer program code configured to, with the at least one processor, cause the apparatus to perform at least the following:
     cause a data tunnel leg to be established between a carrier network and a tunneling client of a computing network;
     receive a first packet from a tunneling client of a remote device in a User Datagram Protocol, the first packet comprising a request for access to network data stored on the computing network;

direct transmission of a packet acknowledgement signal to the remote device, wherein the tunneling client of the remote device is configured to use the packet acknowledgement signal to confirm that the first packet was accurately transmitted;

direct transmission, via the data tunnel leg, of the first packet to the computing network;

receive, from the tunneling client of the computing network, the requested network data as a set of User Datagram Protocol formatted packets in response to the transmission of the first packet to the computing network, wherein the set of packets comprise a defined sequence;

buffer at least a subset of the packets within the carrier network as each of the packets of the subset is received by the carrier network, even though each packet of the subset is not received by the carrier network in the defined sequence; and direct transmission of one or more packets of the set that are next in order of the defined sequence to the remote device in a proper sequence, upon buffering the one or more packets that are next in order of the defined sequence.

16. The apparatus of claim 15, wherein the at least one memory and the computer program code are further configured to, with the processor, cause the apparatus to:

receive a second packet acknowledgement signal from the remote device acknowledging receipt of at least one packet of the set of requested network data packets, wherein the packet acknowledgement signal confirms that the at least one packet of the set of packets was accurately received.

17. An apparatus comprising:
at least one processor; and
at least one memory including computer program code, the at least one memory and the computer program code configured to, with the at least one processor, cause the apparatus to perform at least the following:

direct transmission of a User Datagram Protocol formatted packet to a tunneling device on a carrier network, the packet comprising a request to access network data stored on a computing network, wherein a data tunnel leg has previously been established between the tunneling device and the computing network;

receive a packet acknowledgement signal from the tunneling device;

utilize the packet acknowledgement signal to confirm that the packet was accurately received by the tunneling device;

receive the requested data from the computing network via the tunneling device in the form of one or more User Datagram Protocol formatted packets;

direct transmission of a second packet acknowledgement signal to the tunneling device, wherein the tunneling device is configured to use the second packet acknowledgement signal to confirm that one of the one or more User Datagram Protocol formatted requested data packets was accurately transmitted, wherein the packets comprise a defined sequence;

buffer at least a subset of the packets as each of the subset of the packets are received even though the packets are not necessarily received in the defined sequence;

receive one or more packets that are next in order of the defined sequence; and facilitate provision of the one or more packets that are next in order to a target application.

18. The apparatus of claim 17, wherein the data tunnel leg comprises a session identification that is known by the carrier network and the computing network, wherein the session identification identifies all transmissions through the data tunnel leg until the data tunnel leg is destroyed.

19. An apparatus comprising:
at least one processor; and
at least one memory including computer program code, the at least one memory and the computer program code configured to, with the at least one processor, cause the apparatus to perform at least the following:

cause a first data tunnel leg to be established between a tunneling client of a computing network and a carrier network;

cause a second data tunnel leg to be established between the carrier network and a device;

direct transmission of a packet acknowledgment signal to the device in response to receiving a first packet in a User Datagram Protocol, the device is configured to use the signal to confirm that the first packet was accurately transmitted and fit data in a first protocol format to a first template, the first template located in the tunneling client of the device and comprising one or more inflection points that correspond to commands or other data aspects of the first protocol;

direct transmission of the first template comprising templated data to the computing network via the first data tunnel leg, in response to receipt of the first template from the device, and enabling the tunneling client of the computing network to generate a second template comprising one or more inflection points that correspond to commands or other data aspects of a second protocol in an instance in which the first template matches the second template, the inflection points of the first template match the inflection points of the second template, wherein data of the first protocol format is switched to represent the data in the second protocol format;

direct transmission of a plurality of packets to the second template to facilitate storage of each packet as each packet arrives, wherein the packets are not necessarily received in the ordered sequence in which they were formed; and direct transmission by directing transmission to the second template of all of the plurality of packets necessary to form a consecutive packet which enables arrangement at the second template of the packets into an ordered sequence for delivery to one or more devices or an application in the computing network for processing.

* * * * *